(12) United States Patent
Kearns et al.

(10) Patent No.: US 12,159,253 B2
(45) Date of Patent: Dec. 3, 2024

(54) OUTAGE RISK DETECTION ALERTS

(71) Applicant: PagerDuty, Inc., San Francisco, CA (US)

(72) Inventors: Justin David Kearns, Lexington, KY (US); Michael Gruzynski, Seattle, WA (US); Dipanker Bagga, Mississauga (CA)

(73) Assignee: PagerDuty, Inc., San Francisco, CA (US)

( * ) Notice: Subject to any disclaimer, the term of this patent is extended or adjusted under 35 U.S.C. 154(b) by 69 days.

(21) Appl. No.: 17/960,995

(22) Filed: Oct. 6, 2022

(65) Prior Publication Data

US 2024/0119386 A1    Apr. 11, 2024

(51) Int. Cl.
*G06Q 10/00* (2023.01)
*G06Q 10/0635* (2023.01)
*G06Q 50/06* (2012.01)

(52) U.S. Cl.
CPC ......... *G06Q 10/0635* (2013.01); *G06Q 50/06* (2013.01)

(58) Field of Classification Search
None
See application file for complete search history.

(56) References Cited

U.S. PATENT DOCUMENTS

| 9,646,428 | B1* | 5/2017 | Konrardy | G06Q 10/0635 |
| 2007/0087756 | A1* | 4/2007 | Hoffberg | G06Q 10/06375 |
| | | | | 455/450 |
| 2010/0088141 | A1* | 4/2010 | Hill | G06Q 10/06315 |
| | | | | 705/28 |
| 2012/0072781 | A1* | 3/2012 | Kini | G06F 11/0766 |
| | | | | 714/E11.179 |
| 2018/0020021 | A1* | 1/2018 | Gilmore | H04L 63/1441 |
| 2020/0111039 | A1* | 4/2020 | Yoshikawa | G06Q 10/0635 |
| 2021/0304093 | A1* | 9/2021 | Ronen | G16H 10/60 |

(Continued)

OTHER PUBLICATIONS

Wang, Renfeng, Analysis of the electric power outage data and prediction of electric power outage for major metropolitan areas in Texas using Machine Learning and Time Series Methods, Spring 2022, SMU Data Science Review, https://scholar.smu.edu/datasciencereview/vol6/iss1/5/, p. 1-40. (Year: 2022).*

(Continued)

*Primary Examiner* — Joseph M Waesco
(74) *Attorney, Agent, or Firm* — Young Basile Hanlon & MacFarlane, P.C.

(57) ABSTRACT

An outage risk detection alert is generated for one or more organizations of a plurality of organizations. Computer service incidents are monitored for the plurality of organizations to identify computer services having current computer service incidents. A count of organizations of the plurality of organizations that utilize a particular computer service and that have a current computer service incident related to the particular computer service within a plurality of time windows are aggregated to generate an aggregate count for the particular computer service for each time window of the plurality of time windows. An outage risk detection alert for the particular computer service is generated responsive to the aggregated count for a time window of the plurality of time windows surpassing a threshold level.

17 Claims, 7 Drawing Sheets

(56) References Cited

U.S. PATENT DOCUMENTS

| | | | | |
|---|---|---|---|---|
| 2022/0101273 | A1* | 3/2022 | Chatteron | G06Q 10/063114 |
| 2022/0391992 | A1* | 12/2022 | Konrardy | G08G 1/09675 |
| 2023/0128837 | A1* | 4/2023 | Hu | G06F 11/3447 |
| | | | | 718/104 |
| 2023/0213560 | A1* | 7/2023 | Maheswari | G06Q 10/04 |
| 2023/0351297 | A1* | 11/2023 | Freis | G06Q 10/0635 |
| 2023/0396512 | A1* | 12/2023 | Malleshaiah | H04Q 9/00 |
| 2024/0039937 | A1* | 2/2024 | Koral | H04L 63/1441 |

OTHER PUBLICATIONS

Downdetector by Ookla LLC, Real-rime problem & outage monitoring, https://downdetector.com/.

ThousandEyes part of Cisco, Digital Experience Monitoring, https://www.thousandeyes.com/.

Choffnes et al., Crowdsourcing Service-Level Network Event Monitoring, SIGCOMM'10, Aug. 30-Sep. 3, 2010, New Delhi, India, retrieved from http://ccr.sigcomm.org/online/files/p387.pdf, 12 pages.

Quan, et al., Trinocular: Understanding Internet Reliability Through Adaptive Probing, SIGCOMM'13, Aug. 12-16, 2013, Hong Kong, China, retrieved from https://www.isi.edu/~johnh/PAPERS/Quan13c.pdf, 12 pages.

Richter, et al. Advancing the Art of Internet Edge Outage Detection, IMC '18, Oct. 31-Nov. 2, 2018, Boston, MA, USA, retrieved from https://dl.acm.org/doi/10.1145/3278532.3278563, 14 pages.

Open Technology Fund, Internet Outage Detection and Analysis (IODA): identification of macroscopic Internet outages affecting the edge of the network, retrieved from https://www.opentech.fund/results/supported-projects/internet-outage-detection-and-analysis/.

Rosenmai, Using the Median Absolute Deviation to Find Outliers, Eureka Statistics, Nov. 25, 2013, retrieved from https://eurekastatistics.com/using-the-median-absolute-deviation-to-find-outliers/, 4 pages.

Salesforce, Multi-Instance Service Disruption on May 11-12, 2021, Salesforce post mortem and preventative actions, retrieved from https://help.salesforce.com/s/articleView?id=000358392&type=1, 16 pages.

Kim, Every Major Website Hit by the Fastly Internet Outage: Reddit, Amazon, CNN, Etsy and More, Jun. 8, 2021, retrieved from https://www.newsweek.com/global-internet-outage-major-websites-down-crashed-1598522.

Amazon, Summary of the AWS Service Event in the Northern Virginia (US-EAST-1) Region, retrieved from https://aws.amazon.com/message/12721/, 4 pages.

* cited by examiner

OUTAGE RISK DETECTION ALERTS

TECHNICAL FIELD

This disclosure relates generally to computer services and more specifically, but not exclusively to the detection of outage risks and generating outage risk detection alerts in a noisy, complex, and dynamically changing environment of computer service consumers.

BACKGROUND

Organizations, such as a business, are increasingly relying on third party computer service providers to provide computer services. Organizations may use cloud service providers to deliver computer services, such as computing instances, storage, databases, content delivery, analytics, and many others. While computer service providers may be considered to be generally reliable, the computer services they provide may have intermittent performance issues which may or may not be related to a risk of an operation outage at the computer service provider. These intermittent issues may be monitored by an organization as an event or change in state of a computer service. For example, an organization may experience a brief disruption or temporary reduced level of a computer service which may be recognized as an event. The event, however, does not necessarily correlate to an operation outage of a computer service provider since the computer service provider may have redundant systems or other fault resistant systems in place. Thus, even if a consumer of a computer service experiences an event related to the computer service provider, the event may not indicate that the computer service provider is experiencing an operation outage or that an operation outage will take place in the near future.

Since computer system events may be relatively common and may not correlate to an operation outage, it may be difficult for an organization to know if an event or series of events is indicative of a current operation outage, or if the event or series of events are a precursor to an operation outage. Often, if an organization suspects an operation outage, they may turn to reporting from third parties to ascertain how widespread the issue is. Such third-party reporting has an inherent time lag as the reporting requires a critical mass of users to report the events they are experiencing before the third-party service can confirm that a system or computer service has experienced an operation outage.

SUMMARY

Disclosed herein are implementations of generating an outage risk detection alert for an organization using an outage risk detection system that monitors a plurality of organizations.

The implementations of this disclosure correspond to methods, non-transitory computer readable media, apparatuses, systems, devices, and the like. In some implementations a method comprises monitoring computer service incidents for the plurality of organizations to identify computer services having current computer service incidents, aggregating a count of organizations of the plurality of organizations that utilize a particular computer service and that have a current computer service incident related to the particular computer service within a plurality of time windows to generate an aggregate count for the particular computer service for each time window of the plurality of time windows, wherein each time window of the plurality of time windows is of a same duration and occur at different times, and generating an outage risk detection alert for the particular computer service responsive to the aggregate count for a time window of the plurality of time windows surpassing a threshold level. In some implementations, a non-transitory computer readable medium stores instructions operation to cause one of more processors to perform operations comprising monitoring computer service incidents for a plurality of organizations to identify computer services having current computer service incidents, aggregating a count of organizations of the plurality of organizations that utilize a particular computer service and that have a current computer service incident related to the particular computer service within a plurality of time windows to generate an aggregate count for the particular computer service for each time window of the plurality of time windows, wherein each time window of the plurality of time windows is of a same duration and occur at different times, and generating an outage risk detection alert for the particular computer service responsive to the aggregate count for a time window of the plurality of time windows surpassing a threshold level. In some implementations, an apparatus comprises a memory and a processor configured to execute instructions stored in the memory to monitor computer service incidents for the plurality of organizations to identify computer services having current computer service incidents, aggregate a count of organizations of the plurality of organizations that utilize a particular computer service and that have a current computer service incident related to the particular computer service within a plurality of time windows to generate an aggregate count for the particular computer service for each time window of the plurality of time windows, wherein each time window of the plurality of time windows is of a same duration and occur at different times, and generate an outage risk detection alert for the particular computer service responsive to the aggregate count for a time window of the plurality of time windows surpassing a threshold level.

In some implementations of the method, non-transitory computer readable medium, or apparatus, the monitoring is performed by the outage risk detection system for the plurality of organizations and the current computer service incidents for a first organization are not available to a second organization and the current computer service incidents for the second organization are not available to the first organization, and wherein the outage risk detection alert is provided to both the first organization and the second organization.

In some implementations of the method, non-transitory computer readable medium, or apparatus, the implementation further includes determining a baseline aggregate count for the particular computer service based on a statistical norm aggregate count for the plurality of time windows, and determining a historical variability for the aggregate count for the particular computer service based on a statistical deviation of the aggregate count for the plurality of time windows, wherein the threshold level is based on the baseline aggregate count and a multiple of the historical variability.

In some implementations of the method, non-transitory computer readable medium, or apparatus, the implementation further includes aggregating a second count of organizations of the plurality of organizations that utilize a particular computer service provider and that have a current computer service incident related to the particular computer service provider within the plurality of time windows to generate a second aggregate count for the particular computer service provider for each time window of the plurality of time windows, and generating an outage risk detection alert for the particular computer service provider responsive to the second aggregated count for a time window of the plurality of time windows surpassing a second threshold level.

In some implementations of the method, non-transitory computer readable medium, or apparatus, the implementation further includes aggregating a count of computer services of the organization that have a current computer service incident within the plurality of time windows to generate a third aggregate count for each time window of the plurality of time windows, and generating an outage risk detection alert for the organization responsive to the third aggregated count for a time window of the plurality of time windows surpassing a third threshold level.

In some implementations of the method, non-transitory computer readable medium, or apparatus, the computer services are filtered from a group of computer services to identify computer services that have incidents that historically require human interaction to resolve.

In some implementations of the method, non-transitory computer readable medium, or apparatus, the implementation further includes aggregating a second count of organizations of the plurality of organizations that utilize the particular computer service and that have a current computer service incident related to the particular computer service within a second plurality of time windows to generate a second aggregate count for the particular computer service for each time window of the second plurality of time windows, wherein each time window of the second plurality of time windows is of a same second duration that is greater than the duration of each time window of the plurality of time windows, and generating a second outage risk detection alert for the particular computer service responsive to the second aggregated count for a second time window of the second plurality of time windows surpassing a second threshold level.

Other systems, methods, features, and advantages of the disclosure will be, or will become, apparent to one with skill in the art upon examination of the following figures and detailed description. It is intended that all such additional systems, methods, features, and advantages be included within this description, be within the scope of the disclosure, and be protected by the following claims.

BRIEF DESCRIPTION OF THE DRAWINGS

The disclosure can be better understood with reference to the following drawings and description. The components in the figures are not necessarily to scale, emphasis instead being placed upon illustrating the principles of the disclosure. Moreover, in the figures, like referenced numerals designate corresponding parts throughout the different views.

DETAILED DESCRIPTION

Figure 1:
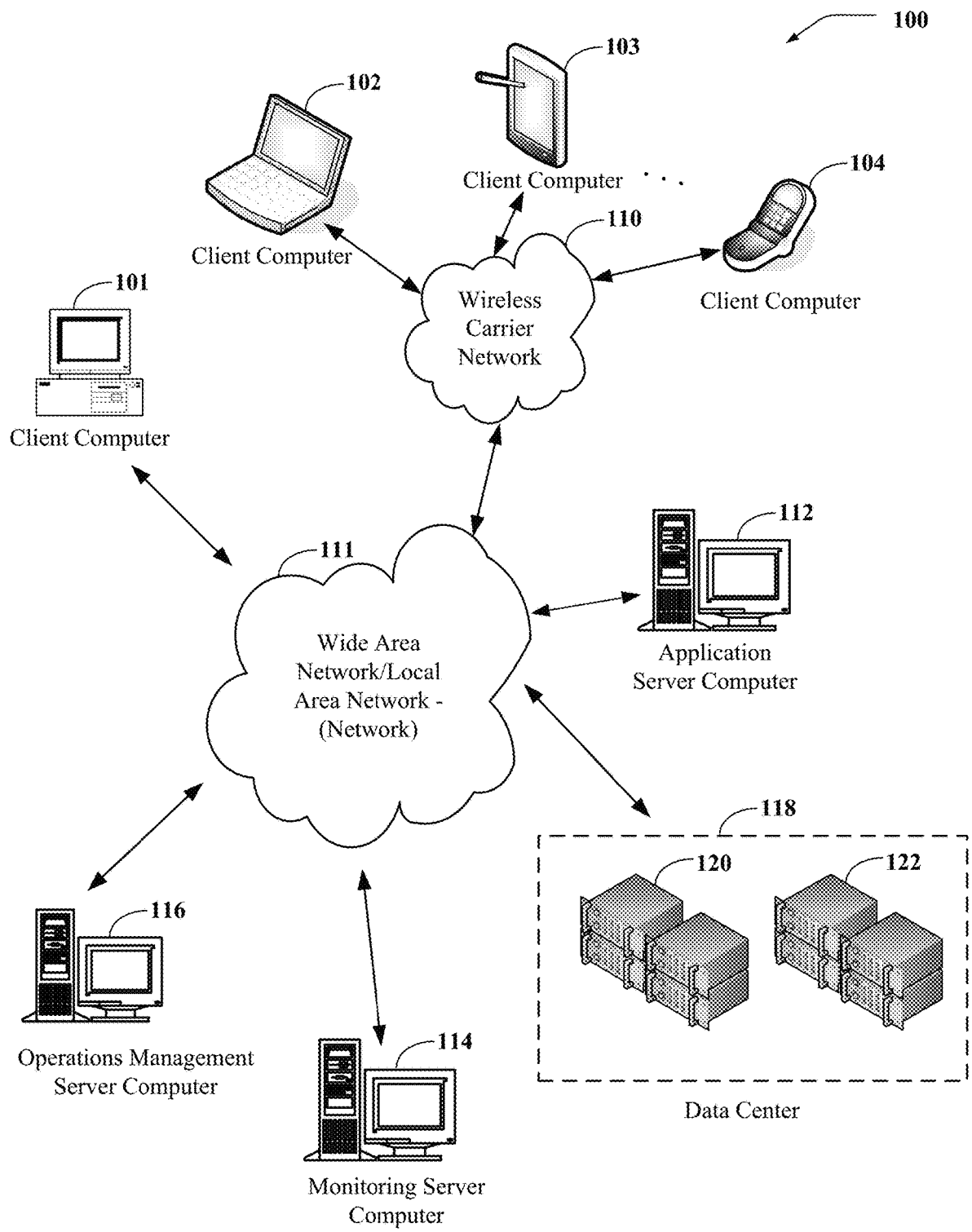
FIG. 1 shows components of one aspect of a computing environment.

An event management bus (EMB) is a computer system that may be arranged to monitor, manage, or compare the computer operations of one or more organizations. The EMB may be arranged to accept various events that indicate conditions occurring in computers of the one or more organizations. The EMB may be arranged to manage operations of several separate organizations at the same time.

Briefly, an event can simply be an indication of a state of change to a component being monitored. An event can be or describe a fact at a moment in time that may consist of a single or a group of correlated conditions that have been monitored and classified into an actionable state. As such, a monitoring tool may detect a condition in the environment (e.g., such as the computing devices, network devices, software applications, etc.) of the organization and transmit a corresponding event to the EMB. The EMB may organize the events according to organization and a component associated with the event. For example, the EMB may group events according to the organization the event was received from and according to a component that was responsible for triggering the event. Depending on the level of impact to the organization's IT environment, if any, an event may trigger an alert and/or an incident.

Non-limiting examples of components include external computer services such as external networks, cloud computing instances, cloud storage systems, cloud database systems, cloud content delivery systems, cloud analytic systems, and internal computer services such as internal networks, internal computer hardware, internal storage systems, internal database systems, internal content delivery systems, and internal analytic systems. An event may identify the component that generated the event and may also include other information, including identification of any hardware responsible for generating the event.

Non-limiting examples of events may include that a monitored operating system process is not running, that a virtual machine is restarting, that disk space on a certain device is low, that processor utilization on a certain device is higher than a threshold, that a shopping cart digital service of an e-commerce site is unavailable, that a digital certificate has or is expiring, that a certain web server is returning a 503 error code (indicating that web server is not ready to handle requests), that a customer relationship management (CRM) system is down (e.g., unavailable) such as because it is not responding to ping requests, and so on.

Events may be received by the EMB due to an underlying cause that caused the event to be generated. Additional examples of events (or causes that may have triggered or resulted in the events) include that a particular cloud-based service is down, that a particular database is unresponsive, that a particular product line is exhibiting issue (such as system errors in web applications or web services applications), that a web server is down (resulting in customers being unable to access a website offered by the web server); that a particular database is corrupted (such as due to a hardware failure); that DNS routing in a network is failing (resulting in users not being able to access a website using web browsers).

An event received at an EMB may trigger an alert and/or an incident. An event may be received at an ingestion software of the EMB, accepted by the ingestion software, queued for grouping with related events, and processed. Processing an event or group of events can include logging the event or group of events for future processing, dropping the event or group of events, triggering (e.g., creating, generating, instantiating, etc.) a corresponding alert, and a triggering (e.g., creating, generating, instantiating, etc.) a corresponding incident. Briefly, an alert can be simply a message indicating that an event happened. An alert can include information about the event, such as a description of the affected process, time the event occurred, and severity. Non-limiting examples of alert formats include text messages, push messages, emails, phone calls, and alarms. An alert may be sent to a team responsible for the operation that triggered the event. An incident can be a task associated with an event and that requires a resolution. For example, non-limiting examples of tasks include determining the cause of an event, rectifying the cause of the event, and mitigating issues related to the event. The incident may be assigned to a responder (e.g., a person or a group of persons) who may become responsible for resolving the incident. The responder may be a part of the team associated with the computer service that generated the event.

The responder may investigate the incident (or, equivalently, the alert that triggered the incident) and (ultimately) perform or cause to be performed actions that resolve the incident. The responder may indicate that the incident has been resolved using an interface (e.g., a graphical user interface) of the EMB. In the process of resolving an incident, the responder may associate data with the incident. The data associated with the incident may include one or more of determined or suspected causes of the incident, determined or desired skills necessary to resolve the incident, other data, or a combination thereof.

On any given day, a large number of alerts and incidents may be generated due to events received by the EMB. Some incidents may require manual intervention to resolve, while others may have an automated resolution. It may be difficult to separate noise arising from common incidents from actual impactful incidents. Furthermore, as described previously, an organization may not be able to easily determine if an alert or incident is indicative of the risk of a larger outage. For example, an organization likely will not have access to information from other organizations regarding outages relating to services or external service providers used in common by multiple organizations either in real-time or on a delayed basis. Thus, it may not be possible for an organization on its own to quickly determine whether an issue, e.g., an application, that depends on a service or external service provider results from an issue with that service or external service provider or comes from some other source. For example, an application may have multiple dependencies which may result in a similar issue. The teachings described herein utilize filtering and aggregation of incidents for an organization and/or across multiple organizations to generate an outage risk detection alerts for an organization and/or a computer service provider in an accurate and reliable manner that reduces the opportunity for false positives and may allow for the identification of the source of an issue automatically, in real-time, more quickly and/or with greater confidence. This allows for the issue/outage to be remediated more quickly and may allow for automatic remediation as a result of the outage risk detection. The outage risk may be internal, from an external IT service provider, or from a widespread external outage. When an outage risk is detected, an alert is generated and other actions may be taken, such as reconfiguring systems that rely on the component at risk of an outage, or other remediations may be taken.

FIG. 1 shows components of one aspect of a computing environment 100 for generating an outage risk detection alert. Not all the components may be required to practice various aspects, and variations in the arrangement and type of the components may be made. As shown, the computing environment 100 includes local area networks (LANs)/wide area networks (WANs) (i.e., a network 111), a wireless network 110, client computers 101-104, an application server computer 112, a monitoring server computer 114, and an operations management server computer 116, which may be or may implement an EMB.

Generally, the client computers 102-104 may include virtually any portable computing device capable of receiving and sending a message over a network, such as the network 111, the wireless network 110, or the like. The client computers 102-104 may also be described generally as client computers that are configured to be portable. Thus, the client computers 102-104 may include virtually any portable computing device capable of connecting to another computing device and receiving information. Such devices include portable devices such as, cellular telephones, smart phones, display pagers, radio frequency (RF) devices, infrared (IR) devices, Personal Digital Assistants (PDA's), handheld computers, laptop computers, wearable computers, tablet computers, integrated devices combining one or more of the preceding devices, or the like. Likewise, the client computers 102-104 may include Internet-of-Things (IOT) devices as well. Accordingly, the client computers 102-104 typically range widely in terms of capabilities and features. For example, a cell phone may have a numeric keypad and a few lines of monochrome Liquid Crystal Display (LCD) on which only text may be displayed. In another example, a mobile device may have a touch-sensitive screen, a stylus, and several lines of color LCD in which both text and graphics may be displayed.

The client computer 101 may include virtually any computing device capable of communicating over a network to send and receive information, including messaging, performing various online actions, or the like. The set of such devices may include devices that typically connect using a wired or wireless communications medium, such as personal computers, multiprocessor systems, microprocessor-based or programmable consumer electronics, network Personal Computers (PCs), or the like. In one aspect, at least some of the client computers 102-104 may operate over wired and/or wireless network. Today, many of these devices include a capability to access and/or otherwise communicate over a network such as the network 111 and/or the wireless network 110. Moreover, the client computers 102-104 may access various computing applications, including a browser or other web-based application.

In one aspect, one or more of the client computers 101-104 may be configured to operate within a business or other entity to perform a variety of services for the business or other entity. For example, a client of the client computers 101-104 may be configured to operate as a web server, an accounting server, a production server, an inventory server, or the like. However, the client computers 101-104 are not constrained to these services and may also be employed, for example, as an end-user computing node, in other aspects. Further, it should be recognized that more or less client computers may be included within a system such as described herein, and aspects are therefore not constrained by the number or type of client computers employed.

A web-enabled client computer may include a browser application that is configured to receive and to send web pages, web-based messages, or the like. The browser application may be configured to receive and display graphics, text, multimedia, or the like, employing virtually any web-based language, including a wireless application protocol messages (WAP), or the like. In one aspect, the browser application is enabled to employ Handheld Device Markup Language (HDML), Wireless Markup Language (WML), WMLScript, JavaScript, Standard Generalized Markup Language (SGML), HyperText Markup Language (HTML), eXtensible Markup Language (XML), HTML5, or the like, to display and send a message. In one aspect, a user of the client computer may employ the browser application to perform various actions over a network.

The client computers 101-104 also may include at least one other client application that is configured to receive and/or send data, operations information, between another computing device. The client application may include a capability to provide requests and/or receive data relating to managing, operating, or configuring the operations management server computer 116.

The wireless network 110 can be configured to couple the client computers 102-104 with network 111. The wireless network 110 may include any of a variety of wireless sub-networks that may further overlay stand-alone ad-hoc networks, or the like, to provide an infrastructure-oriented connection for the client computers 102-104. Such sub-networks may include mesh networks, Wireless LAN (WLAN) networks, cellular networks, or the like.

The wireless network 110 may further include an autonomous system of terminals, gateways, routers, or the like connected by wireless radio links, or the like. These connectors may be configured to move freely and randomly and organize themselves arbitrarily, such that the topology of the wireless network 110 may change rapidly.

The wireless network 110 may further employ a plurality of access technologies including 2nd (2G), 3rd (3G), 4th (4G), 5th (5G) generation radio access for cellular systems, WLAN, Wireless Router (WR) mesh, or the like. Access technologies such as 2G, 3G, 4G, and future access networks may enable wide area coverage for mobile devices, such as the client computers 102-104 with various degrees of mobility. For example, the wireless network 110 may enable a radio connection through a radio network access such as Global System for Mobil communication (GSM), General Packet Radio Services (GPRS), Enhanced Data GSM Environment (EDGE), Wideband Code Division Multiple Access (WCDMA), or the like. In essence, the wireless network 110 may include virtually any wireless communication mechanism by which information may travel between the client computers 102-104 and another computing device, network, or the like.

The network 111 can be configured to couple network devices with other computing devices, including, the operations management server computer 116, the monitoring server computer 114, the application server computer 112, the client computer 101, and through the wireless network 110 to the client computers 102-104. The network 111 can be enabled to employ any form of computer readable media for communicating information from one electronic device to another. Also, the network 111 can include the internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. For example, various Internet Protocols (IP), Open Systems Interconnection (OSI) architectures, and/or other communication protocols, architectures, models, and/or standards, may also be employed within the network 111 and the wireless network 110. Furthermore, remote computers and other related electronic devices could be remotely connected to either LANs or WANs via a modem and temporary telephone link. In essence, the network 111 includes any communication method by which information may travel between computing devices.

Additionally, communication media typically embodies computer-readable instructions, data structures, program modules, or other transport mechanism and includes any information delivery media. By way of example, communication media includes wired media such as twisted pair, coaxial cable, fiber optics, wave guides, and other wired media and wireless media such as acoustic, RF, infrared, and other wireless media. Such communication media is distinct from, however, computer-readable devices described in more detail below.

Figure 3:
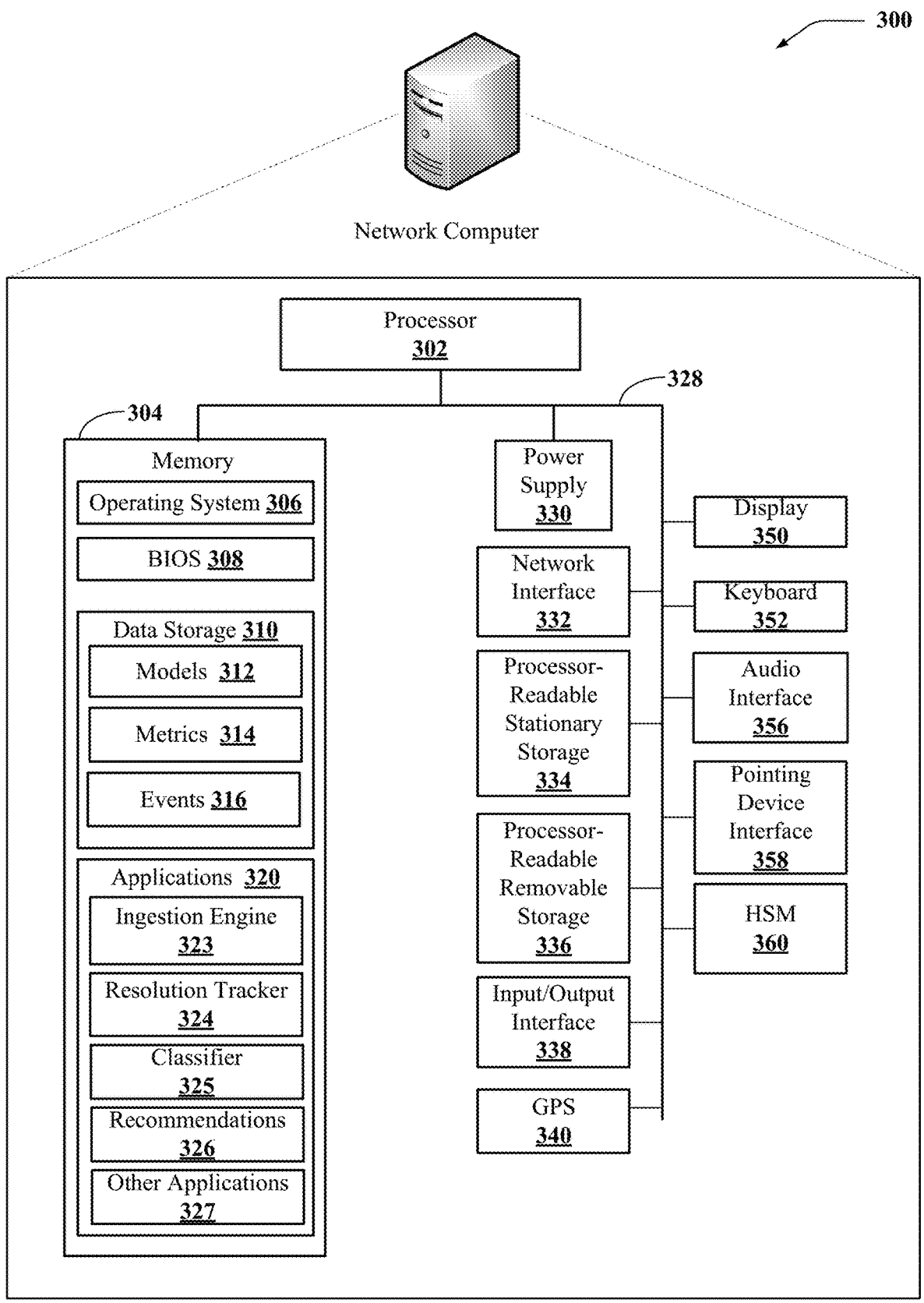
FIG. 3 shows one aspect of a network computer that may at least partially implement generating outage risk detection alerts.

The operations management server computer 116 may include virtually any network computer usable to provide computer operations management services, such as a network computer, as described with respect to FIG. 3. In one aspect, the operations management server computer 116 employs various techniques for managing the operations of computer operations, networking performance, customer service, customer support, resource schedules and notification policies, event management, or the like. Also, the operations management server computer 116 may be arranged to interface/integrate with one or more external systems such as telephony carriers, email systems, web services, or the like to perform computer operations management. Further, the operations management server computer 116 may obtain various events and/or performance metrics collected by other systems, such as the monitoring server computer 114.

In at least one of the various aspects, the monitoring server computer 114 represents various computers that may be arranged to monitor the performance of computer operations for an entity (e.g., company or enterprise). For example, the monitoring server computer 114 may be arranged to monitor whether applications/systems are operational, network performance, trouble tickets and/or their resolution, or the like. In some aspects, one or more of the functions of the monitoring server computer 114 may be performed by the operations management server computer 116.

Devices that may operate as the operations management server computer 116 include various network computers, including, but not limited to personal computers, desktop computers, multiprocessor systems, microprocessor-based or programmable consumer electronics, network PCs, server devices, network appliances, or the like. It should be noted that while the operations management server computer 116 is illustrated as a single network computer, the disclosure is not so limited. Thus, the operations management server computer 116 may represent a plurality of network computers. For example, in one aspect, the operations management server computer 116 may be distributed over a plurality of network computers and/or implemented using cloud architecture.

Moreover, the operations management server computer 116 is not limited to a particular configuration. Thus, the operations management server computer 116 may operate using a master/slave approach over a plurality of network computers, within a cluster, a peer-to-peer architecture, and/or any of a variety of other architectures.

In some aspects, one or more data centers, such as a data center 118, may be communicatively coupled to the wireless network 110 and/or the network 111. In at least one of the various aspects, the data center 118 may be a portion of a private data center, public data center, public cloud environment, or private cloud environment. In some aspects, the data center 118 may be a server room/data center that is physically under the control of an organization. The data center 118 may include one or more enclosures of network computers, such as an enclosure 120 and an enclosure 122.

The enclosure 120 and the enclosure 122 may be enclosures (e.g., racks, cabinets, or the like) of network computers and/or blade servers in the data center 118. In some aspects, the enclosure 120 and the enclosure 122 may be arranged to include one or more network computers arranged to operate as operations management server computers, monitoring server computers (e.g., the operations management server computer 116, the monitoring server computer 114, or the like), storage computers, or the like, or combination thereof. Further, one or more cloud instances may be operative on one or more network computers included in the enclosure 120 and the enclosure 122.

The data center 118 may also include one or more public or private cloud networks. Accordingly, the data center 118 may include multiple physical network computers, interconnected by one or more networks, such as networks similar to and/or the including network 111 and/or wireless network 110. The data center 118 may enable and/or provide one or more cloud instances (not shown). The number and composition of cloud instances may vary depending on the demands of individual users, cloud network arrangement, operational loads, performance considerations, application needs, operational policy, or the like. In at least one of the various aspects, the data center 118 may be arranged as a hybrid network that includes a combination of hardware resources, private cloud resources, public cloud resources, or the like.

As such, the operations management server computer 116 is not to be construed as being limited to a single environment, and other configurations and architectures are also contemplated. The operations management server computer 116 may employ processes such as described below in conjunction with at least some of the figures discussed below to perform at least some of its actions.

Figure 2:
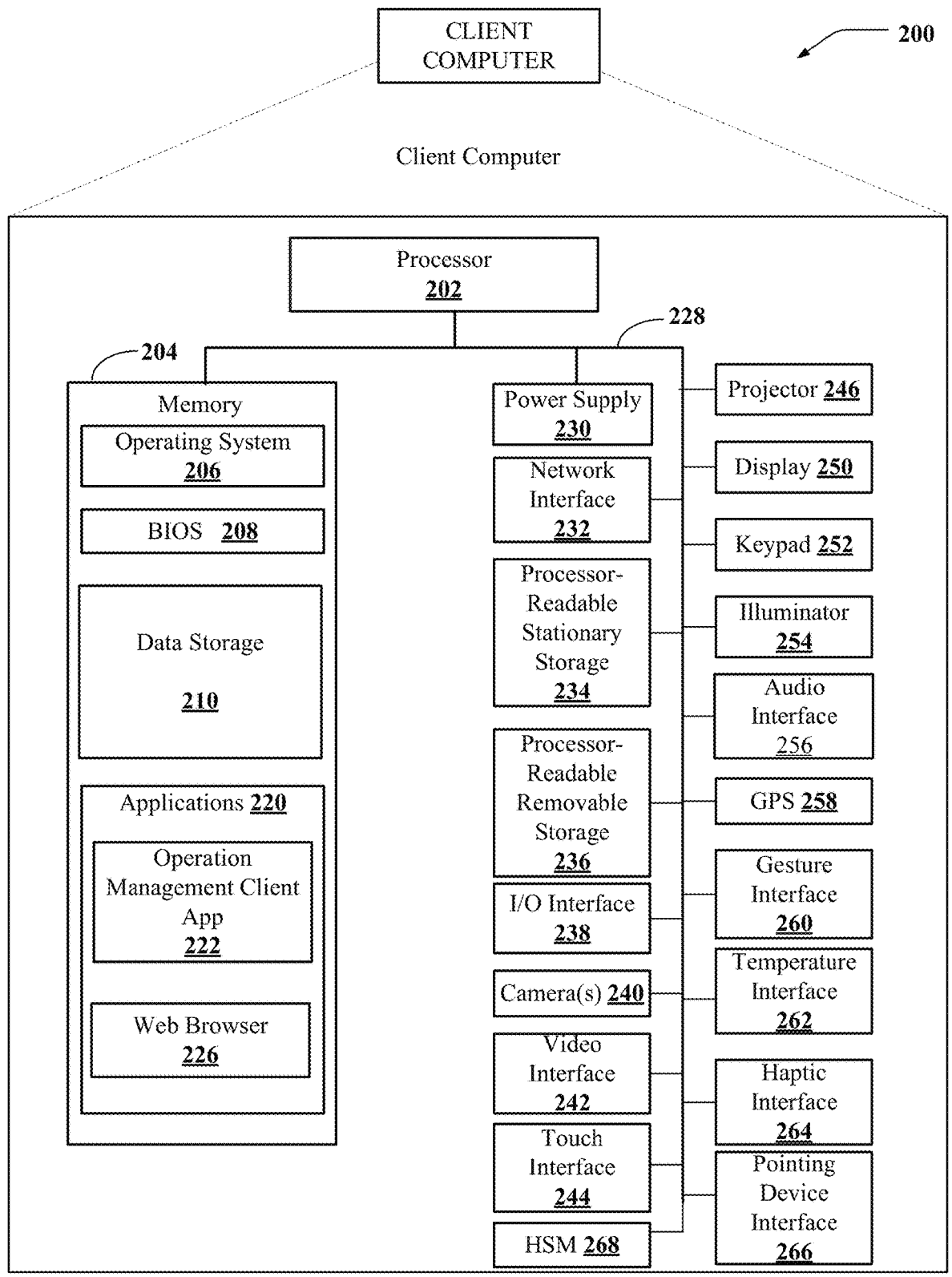
FIG. 2 shows one aspect of a client computer.

FIG. 2 shows one aspect of a client computer 200. The client computer 200 may include more or less components than those shown in FIG. 2. The client computer 200 may represent, for example, at least one aspect of mobile computers or client computers shown in FIG. 1.

The client computer 200 may include a processor 202 in communication with a memory 204 via a bus 228. The client computer 200 may also include a power supply 230, a network interface 232, an audio interface 256, a display 250, a keypad 252, an illuminator 254, a video interface 242, an input/output interface (i.e., an I/O interface 238), a haptic interface 264, a global positioning systems (GPS) receiver 258, an open air gesture interface 260, a temperature interface 262, a camera 240, a projector 246, a pointing device interface 266, a processor-readable stationary storage device 234, and a non-transitory processor-readable removable storage device 236. The client computer 200 may optionally communicate with a base station (not shown), or directly with another computer. And in one aspect, although not shown, a gyroscope may be employed within the client computer 200 to measuring or maintaining an orientation of the client computer 200.

The power supply 230 may provide power to the client computer 200. A rechargeable or non-rechargeable battery may be used to provide power. The power may also be provided by an external power source, such as an AC adapter or a powered docking cradle that supplements or recharges the battery.

The network interface 232 includes circuitry for coupling the client computer 200 to one or more networks, and is constructed for use with one or more communication protocols and technologies including, but not limited to, protocols and technologies that implement any portion of the OSI model for mobile communication (GSM), CDMA, time division multiple access (TDMA), UDP, TCP/IP, SMS, MMS, GPRS, WAP, UWB, WiMax, SIP/RTP, GPRS, EDGE, WCDMA, LTE, UMTS, OFDM, CDMA2000, EV-DO, HSDPA, or any of a variety of other wireless communication protocols. The network interface 232 is sometimes known as a transceiver, transceiving device, or network interface card (NIC).

The audio interface 256 may be arranged to produce and receive audio signals, such as the sound of a human voice. For example, the audio interface 256 may be coupled to a speaker and microphone (not shown) to enable telecommunication with others or generate an audio acknowledgement for some action. A microphone in the audio interface 256 can also be used for input to or control of the client computer 200, e.g., using voice recognition, detecting touch based on sound, and the like.

The display 250 may be a liquid crystal display (LCD), gas plasma, electronic ink, light-emitting diode (LED), Organic LED (OLED) or any other type of light reflective or light transmissive display that can be used with a computer. The display 250 may also include a touch interface 244 arranged to receive input from an object such as a stylus or a digit from a human hand, and may use resistive, capacitive, surface acoustic wave (SAW), infrared, radar, or other technologies to sense touch or gestures.

The projector 246 may be a remote handheld projector or an integrated projector that is capable of projecting an image on a remote wall or any other reflective object, such as a remote screen.

The video interface 242 may be arranged to capture video images, such as a still photo, a video segment, an infrared video, or the like. For example, the video interface 242 may be coupled to a digital video camera, a web-camera, or the like. The video interface 242 may comprise a lens, an image sensor, and other electronics. Image sensors may include a complementary metal-oxide-semiconductor (CMOS) integrated circuit, charge-coupled device (CCD), or any other integrated circuit for sensing light.

The keypad 252 may comprise any input device arranged to receive input from a user. For example, the keypad 252 may include a push button numeric dial or a keyboard. The keypad 252 may also include command buttons that are associated with selecting and sending images.

The illuminator 254 may provide a status indication or provide light. The illuminator 254 may remain active for specific periods of time or in response to event messages. For example, when the illuminator 254 is active, it may backlight the buttons on the keypad 252 and stay on while the client computer is powered. Also, the illuminator 254 may backlight these buttons in various patterns when particular actions are performed, such as dialing another client computer. The illuminator 254 may also cause light sources positioned within a transparent or translucent case of the client computer to illuminate in response to actions.

Further, the client computer 200 may also comprise a hardware security module (i.e., an HSM 268) for providing additional tamper resistant safeguards for generating, storing, or using security/cryptographic information such as, keys, digital certificates, passwords, passphrases, two-factor authentication information, or the like. In some aspects, hardware security module may be employed to support one or more standard public key infrastructures (PKI), and may be employed to generate, manage, or store keys pairs, or the like. In some aspects, the HSM 268 may be a stand-alone computer. In other aspects, the HSM 268 may be arranged as a hardware card that may be added to a client computer.

The I/O 238 can be used for communicating with external peripheral devices or other computers, such as other client computers and network computers. The peripheral devices may include an audio headset, display screen glasses, remote speaker system, remote speaker, and microphone system, and the like. The I/O interface 238 can utilize one or more technologies, such as Universal Serial Bus (USB), Infrared, WiFi, WiMax, Bluetooth™, and the like.

The I/O interface 238 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect or measure data that is external to the client computer 200.

The haptic interface 264 may be arranged to provide tactile feedback to a user of the client computer. For example, the haptic interface 264 may be employed to vibrate the client computer 200 in a particular way when another user of a computer is calling. The temperature interface 262 may be used to provide a temperature measurement input or a temperature changing output to a user of the client computer 200. The open air gesture interface 260 may sense physical gestures of a user of the client computer 200, for example, by using single or stereo video cameras, radar, a gyroscopic sensor inside a computer held or worn by the user, or the like. The camera 240 may be used to track physical eye movements of a user of the client computer 200.

The GPS transceiver 258 can determine the physical coordinates of the client computer 200 on the surface of the earth, which typically outputs a location as latitude and longitude values. The GPS transceiver 258 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of the client computer 200 on the surface of the earth. It is understood that under different conditions, the GPS transceiver 258 can determine a physical location for the client computer 200. In at least one aspect, however, the client computer 200 may, through other components, provide other information that may be employed to determine a physical location of the client computer, including, for example, a Media Access Control (MAC) address, IP address, and the like.

Human interface components can be peripheral devices that are physically separate from the client computer 200, allowing for remote input or output to the client computer 200. For example, information routed as described here through human interface components such as the display 250 or the keypad 252 can instead be routed through the network interface 232 to appropriate human interface components located remotely. Examples of human interface peripheral components that may be remote include, but are not limited to, audio devices, pointing devices, keypads, displays, cameras, projectors, and the like. These peripheral components may communicate over a Pico Network such as Bluetooth™, Bluetooth LE, Zigbee™ and the like. One non-limiting example of a client computer with such peripheral human interface components is a wearable computer, which might include a remote pico projector along with one or more cameras that remotely communicate with a separately located client computer to sense a user's gestures toward portions of an image projected by the pico projector onto a reflected surface such as a wall or the user's hand.

A client computer may include a web browser application 226 that is configured to receive and to send web pages, web-based messages, graphics, text, multimedia, and the like. The client computer's browser application may employ virtually any programming language, including a wireless application protocol messages (WAP), and the like. In at least one aspect, the browser application is enabled to employ Handheld Device Markup Language (HDML), Wireless Markup Language (WML), WMLScript, JavaScript, Standard Generalized Markup Language (SGML), HyperText Markup Language (HTML), eXtensible Markup Language (XML), HTML5, and the like.

The memory 204 may include RAM, ROM, or other types of memory. The memory 204 illustrates an example of computer-readable storage media (devices) for storage of information such as computer-readable instructions, data structures, program modules, or other data. The memory 204 may store a BIOS 208 for controlling low-level operation of the client computer 200. The memory may also store an operating system 206 for controlling the operation of the client computer 200. It will be appreciated that this component may include a general-purpose operating system such as a version of UNIX, or LINUX™, or a specialized client computer communication operating system such as Windows Phone™, or IOS® operating system. The operating system may include, or interface with, a Java virtual machine module that enables control of hardware components or operating system operations via Java application programs.

The memory 204 may further include one or more data storage 210, which can be utilized by the client computer 200 to store, among other things, the applications 220 or other data. For example, the data storage 210 may also be employed to store information that describes various capabilities of the client computer 200. The information may then be provided to another device or computer based on any of a variety of methods, including being sent as part of a header during a communication, sent upon request, or the like. The data storage 210 may also be employed to store social networking information, including address books, buddy lists, aliases, user profile information, or the like. The data storage 210 may further include program code, data, algorithms, and the like, for use by a processor, such as the processor 202 to execute and perform actions. In one aspect, at least some of the data storage 210 might also be stored on another component of the client computer 200, including, but not limited to, the non-transitory processor-readable removable storage device 236, the processor-readable stationary storage device 234, or external to the client computer.

The applications 220 may include computer executable instructions which, when executed by the client computer 200, transmit, receive, or otherwise process instructions and data. The applications 220 may include, for example, an operations management client application 222. In at least one of the various aspects, the operations management client application 222 may be used to exchange communications to and from the operations management server computer 116 of FIG. 1, the monitoring server computer 114 of FIG. 1, the application server computer 112 of FIG. 1, or the like. Exchanged communications may include, but are not limited to, queries, searches, messages, notification messages, events, alerts, performance metrics, log data, API calls, or the like, combination thereof.

Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth.

Additionally, in one or more aspects (not shown in the figures), the client computer 200 may include an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. Also, in one or more aspects (not shown in the figures), the client computer 200 may include a hardware microcontroller instead of a CPU. In at least one aspect, the microcontroller may directly execute its own embedded logic to perform actions and access its own internal memory and its own external Input and Output Interfaces (e.g., hardware pins or wireless transceivers) to perform actions, such as System On a Chip (SOC), or the like.

FIG. 3 shows one aspect of a network computer 300 that may at least partially implement generating an outage risk detection alert. The network computer 300 may include more or less components than those shown in FIG. 3. The network computer 300 may represent, for example, one aspect of at least one EMB, such as the operations management server computer 116 of FIG. 1, the monitoring server computer 114 of FIG. 1, or an application server computer 112 of FIG. 1. Further, in some aspects, the network computer 300 may represent one or more network computers included in a data center, such as, the data center 118, the enclosure 120, the enclosure 122, or the like.

As shown in the FIG. 3, the network computer 300 includes a processor 302 in communication with a memory 304 via a bus 328. The network computer 300 also includes a power supply 330, a network interface 332, an audio interface 356, a display 350, a keyboard 352, an input/output interface (i.e., an I/O interface 338), a processor-readable stationary storage device 334, and a processor-readable removable storage device 336. The power supply 330 provides power to the network computer 300.

The network interface 332 includes circuitry for coupling the network computer 300 to one or more networks, and is constructed for use with one or more communication protocols and technologies including, but not limited to, protocols and technologies that implement any portion of the Open Systems Interconnection model (OSI model), global system for mobile communication (GSM), code division multiple access (CDMA), time division multiple access (TDMA), user datagram protocol (UDP), transmission control protocol/Internet protocol (TCP/IP), Short Message Service (SMS), Multimedia Messaging Service (MMS), general packet radio service (GPRS), WAP, ultra-wide band (UWB), IEEE 802.16 Worldwide Interoperability for Microwave Access (WiMax), Session Initiation Protocol/Realtime Transport Protocol (SIP/RTP), or any of a variety of other wired and wireless communication protocols. The network interface 332 is sometimes known as a transceiver, transceiving device, or network interface card (NIC). The network computer 300 may optionally communicate with a base station (not shown), or directly with another computer.

The audio interface 356 is arranged to produce and receive audio signals such as the sound of a human voice. For example, the audio interface 356 may be coupled to a speaker and microphone (not shown) to enable telecommunication with others or generate an audio acknowledgement for some action. A microphone in the audio interface 356 can also be used for input to or control of the network computer 300, for example, using voice recognition.

The display 350 may be a liquid crystal display (LCD), gas plasma, electronic ink, light-emitting diode (LED), Organic LED (OLED) or any other type of light reflective or light transmissive display that can be used with a computer. The display 350 may be a handheld projector or pico projector capable of projecting an image on a wall or other object.

The network computer 300 may also comprise the I/O interface 338 for communicating with external devices or computers not shown in FIG. 3. The I/O interface 338 can utilize one or more wired or wireless communication technologies, such as USB™, Firewire™, WiFi, WiMax, Thunderbolt™, Infrared, Bluetooth™, Zigbee™, serial port, parallel port, and the like.

Also, the I/O interface 338 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect or measure data that is external to the network computer 300. Human interface components can be physically separate from network computer 300, allowing for remote input or output to the network computer 300. For example, information routed as described here through human interface components such as the display 350 or the keyboard 352 can instead be routed through the network interface 332 to appropriate human interface components located elsewhere on the network. Human interface components include any component that allows the computer to take input from, or send output to, a human user of a computer. Accordingly, pointing devices such as mice, styluses, track balls, or the like, may communicate through a pointing device interface 358 to receive user input.

A GPS transceiver 340 can determine the physical coordinates of network computer 300 on the surface of the Earth, which typically outputs a location as latitude and longitude values. The GPS transceiver 340 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of the network computer 300 on the surface of the Earth. It is understood that under different conditions, the GPS transceiver 340 can determine a physical location for the network computer 300. In at least one aspect, however, the network computer 300 may, through other components, provide other information that may be employed to determine a physical location of the client computer, including, for example, a Media Access Control (MAC) address, IP address, and the like.

The memory 304 may include Random Access Memory (RAM), Read-Only Memory (ROM), or other types of memory. The memory 304 illustrates an example of computer-readable storage media (devices) for storage of information such as computer-readable instructions, data structures, program modules, or other data. The memory 304 stores a basic input/output system (i.e., a BIOS 308) for controlling low-level operation of the network computer 300. The memory also stores an operating system 306 for controlling the operation of the network computer 300. It will be appreciated that this component may include a general-purpose operating system such as a version of UNIX, or LINUX™, or a specialized operating system such as Microsoft Corporation's Windows® operating system, or the Apple Corporation's IOS® operating system. The operating system may include, or interface with a Java virtual machine module that enables control of hardware components or operating system operations via Java application programs. Likewise, other runtime environments may be included.

The memory 304 may further include a data storage 310, which can be utilized by the network computer 300 to store, among other things, applications 320 or other data. For example, the data storage 310 may also be employed to store information that describes various capabilities of the network computer 300. The information may then be provided to another device or computer based on any of a variety of methods, including being sent as part of a header during a communication, sent upon request, or the like. The data storage 310 may also be employed to store social networking information, including address books, buddy lists, aliases, user profile information, or the like. The data storage 310 may further include program code, instructions, data, algorithms, and the like, for use by a processor, such as the processor 302 to execute and perform actions such as those actions described below. In one aspect, at least some of the data storage 310 might also be stored on another component of the network computer 300, including, but not limited to, the non-transitory media inside processor-readable removable storage device 336, the processor-readable stationary storage device 334, or any other computer-readable storage device within the network computer 300 or external to network computer 300. The data storage 310 may include, for example, models 312, operations metrics 314, events 316, or the like.

The applications 320 may include computer executable instructions which, when executed by the network computer 300, transmit, receive, or otherwise process messages (e.g., SMS, Multimedia Messaging Service (MMS), Instant Message (IM), email, or other messages), audio, video, and enable telecommunication with another user of another mobile computer. Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth. The applications 320 may include an ingestion engine 323, a resolution tracker engine 324, a classifier 325, a recommendation engine 326 (which may be or include a machine-learning model as further described herein), and other applications 327. In at least one of the various aspects, one or more of the applications may be implemented as modules or components of another application. Further, in at least one of the various aspects, applications may be implemented as operating system extensions, modules, plugins, or the like.

Furthermore, in at least one of the various aspects, the ingestion engine 323, the resolution tracker engine 324, the classifier 325, the pre-processing engine 326, the other applications 327, or the like, may be operative in a cloud-based computing environment. In at least one of the various aspects, these applications, and others, that comprise the management platform may be executing within virtual machines or virtual servers that may be managed in a cloud-based based computing environment. In at least one of the various aspects, in this context the applications may flow from one physical network computer within the cloud-based environment to another depending on performance and scaling considerations automatically managed by the cloud computing environment. Likewise, in at least one of the various aspects, virtual machines or virtual servers dedicated to the ingestion engine 323, the resolution tracker engine 324, the classifier 325, the pre-processing engine 326, the other applications 327, may be provisioned and de-commissioned automatically.

In at least one of the various aspects, the applications may be arranged to employ geo-location information to select one or more localization features, such as time zones, languages, currencies, calendar formatting, or the like. Localization features may be used in user-interfaces and well as internal processes or databases. Further, in some aspects, localization features may include information regarding culturally significant events or customs (e.g., local holidays, political events, or the like) In at least one of the various aspects, geo-location information used for selecting localization information may be provided by the GPS transceiver 340. Also, in some aspects, geolocation information may include information providing using one or more geolocation protocol over the networks, such as, the wireless network 108 or the network 111.

Also, in at least one of the various aspects, the ingestion engine 323, the resolution tracker engine 324, the classifier 325, the pre-processing engine 326, the other applications 327, or the like, may be located in virtual servers running in a cloud-based computing environment rather than being tied to one or more specific physical network computers.

Further, the network computer 300 may also comprise hardware security module (i.e., an HSM 360) for providing additional tamper resistant safeguards for generating, storing, or using security/cryptographic information such as, keys, digital certificates, passwords, passphrases, two-factor authentication information, or the like. In some aspects, hardware security module may be employed to support one or more standard public key infrastructures (PKI), and may be employed to generate, manage, or store keys pairs, or the like. In some aspects, the HSM 360 may be a stand-alone network computer, in other cases, the HSM 360 may be arranged as a hardware card that may be installed in a network computer.

Additionally, in one or more aspects (not shown in the figures), the network computer 300 may include an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. Also, in one or more aspects (not shown in the figures), the network computer may include a hardware microcontroller instead of a CPU. In at least one aspect, the microcontroller may directly execute its own embedded logic to perform actions and access its own internal memory and its own external Input and Output Interfaces (e.g., hardware pins or wireless transceivers) to perform actions, such as System On a Chip (SOC), or the like.

Figure 4:
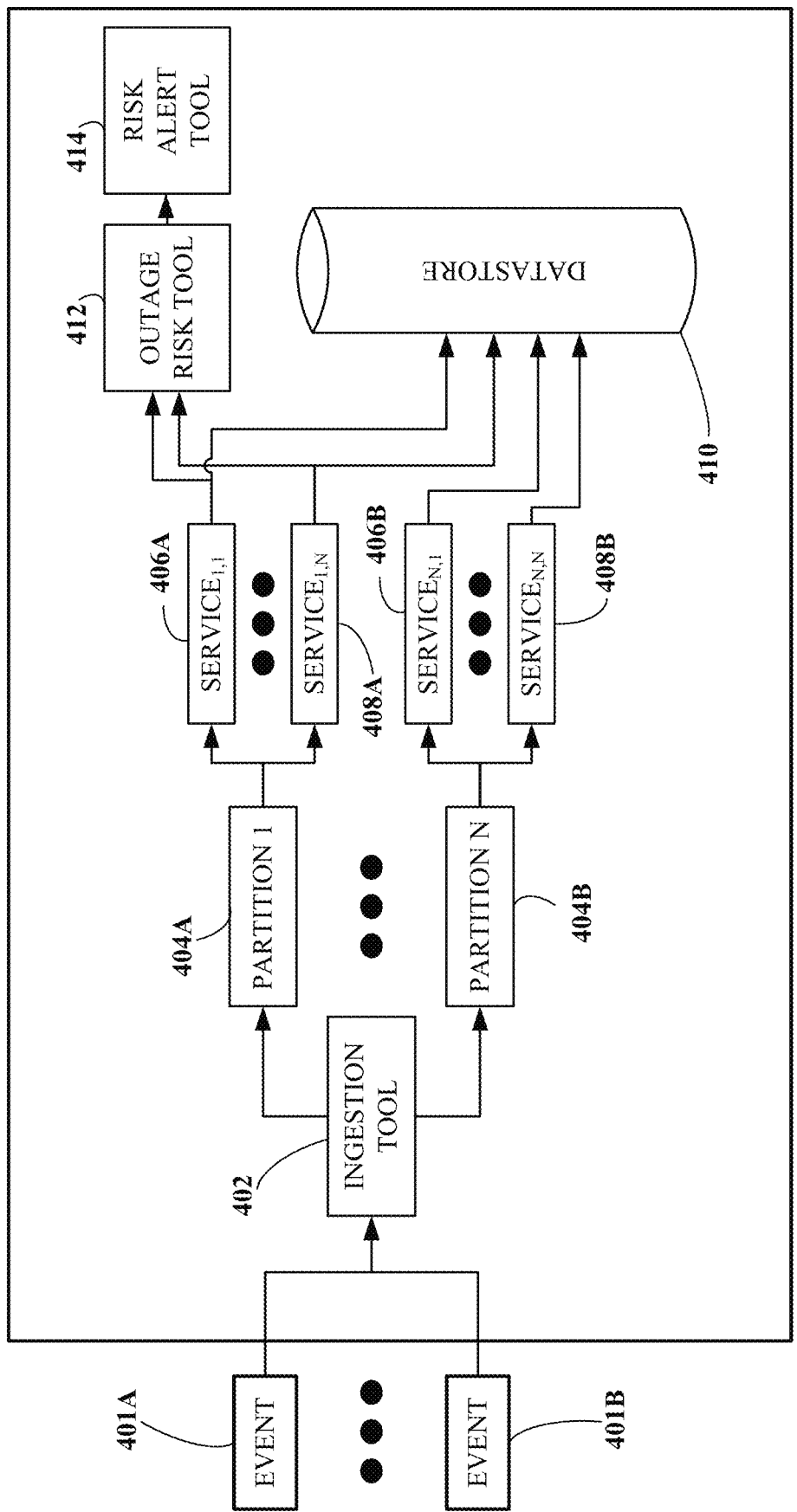
FIG. 4 illustrates a logical architecture of a system for generating outage risk detection alerts.

FIG. 4 illustrates a logical architecture of a system 400 for generating an outage risk detection alert. The system 400 can be an EMB or a system within or interfaced with an EMB and can be used to generate an outage risk detection alert.

In an example, an event, or group of events, may trigger an alert responsive to the event or group of events in a network managed system. The system 400 uses data associated with the event (including data associated with objects related to the event, such as an alert) to identify a source that triggered the event. The data associated with the incident can include an attribute or a combination of attributes, descriptive data, payload data, or other data. For example, a source identifier might be used to identify a source that triggered the event. The system 400 may then generate an alert or incident that may be delivered to a team responsible for the source that triggered the alert.

In at least one of the various embodiments, a system 400 for generating an outage risk detection alert may include various components. In this example, the system 400 includes an ingestion tool 402, one or more partitions 404A-404B, one or more event processing services 406A-406B and 408A-408B, a data store 410, an outage risk determination tool 412, and a risk alert tool 414.

One or more systems, such as monitoring systems, of a plurality of organizations may be configured to transmit events, such as event 401A and event 401B, to the system 400 for processing. The system 400 may provide several event processing services, including an incident generation service. In the example of FIG. 4, event processing service$_{1,1}$ 406A and event processing service$_{N,1}$ 406B correspond to incident generation event processing services. An incident generation event processing service may, for example, process a received event or group of events into an actionable item (e.g., an incident). As mentioned above, a received event may trigger an alert, which may trigger an incident, which in turn may cause notifications of the incident to be transmitted to responders.

An event received from an organization may include an indication of one or more event processing services that are to operate on (e.g., process, etc.) the event. The indication of the event processing service may be referred to as a routing key. A routing key may be unique to a managed organization. As such, two events that are received from two different managed organizations for processing by a same event processing service would include two different routing keys. A routing key may be unique to the event processing service that is to receive and process an event. As such, two events associated with two different routing keys and received from the same managed organization for processing may be directed to (e.g., processed by) different event processing services.

The ingestion tool 402 may be configured to receive or obtain one or more different types of events provided by various sources, here represented by events 401A, 401B. The ingestion tool 402 may accept or reject received events. In an example, events may be rejected when events are received at a rate that is higher than a configured event acceptance rate. If the ingestion tool 402 accepts an event, the ingestion tool 402 may place the event in a partition for further processing. If an event is rejected, the event is not placed in a partition for further processing. The ingestion tool 402 may notify the sender of the event of whether the event was accepted or rejected. Grouping events into partitions can be used to enable parallel processing and/or scaling of the system 400 so that the system 400 can handle (e.g., process, etc.) more and more events and/or more and more organizations.

The ingestion tool 402 may be arranged to receive the various events and perform various actions, including, filtering, reformatting, information extraction, data normalizing, or the like, or combination thereof, to enable the events to be stored (e.g., queued, etc.) and further processed. In at least one of the various embodiments, the ingestion tool 402 may be arranged to normalize incoming events into a unified common event format. Accordingly, in some embodiments, the ingestion tool 402 may be arranged to employ configuration information, including, rules, templates, maps, dictionaries, or the like, or combination thereof, to normalize the fields and values of incoming events to the common event format. The ingestion tool 402 may assign (e.g., associate, etc.) an ingested timestamp with an accepted event.

In at least one of the various embodiments, an event may be stored in a partition, such as one of partition 404A or partition 404B. A partition can be, or can be thought of, as a queue (i.e., a first-in-first-out queue) of events. FIG. 4 is shown as including two partitions (i.e., the partitions 404A and 404B). However, the disclosure is not so limited and the system 400 can include one or more than two partitions.

In an example, different event processing services of the system 400 may be configured to operate on events of the different partitions. In an example, the same services (e.g., identical logic) may be configured to operate on the accepted events in different partitions. To illustrate, in FIG. 4, the event processing services 406A and 408A process the events of the partition 404A, and the event processing services 406B and 408B process the events of partition the 404B, where the event processing service 406A and the event processing service 406B execute the same logic (e.g., perform the same operations) of an incident generation service but on different physical or virtual servers; and the event processing service 408A and the service 408B execute the same logic of a second service, but on different physical or virtual servers. In an example, different types of events may be routed to different partitions. As such, the event processing services 406A-406-B and 408A-408B may perform different logic as appropriate for the events processed by the event processing service.

An (e.g., each) event may also be associated with one or more event processing services that may be responsible for processing the events. As such, an event can be said to be addressed or targeted to the one or more event processing services that are to process the event. As mentioned above, an event can include or can be associated with a routing key that indicates the one or more event processing services that are to receive the event for processing.

Events may be variously formatted messages that reflect the occurrence of events or incidents that have occurred in the computing systems or infrastructures of one or more managed organizations. Such events may include facts regarding system errors, warning, failure reports, customer service requests, status messages, or the like. One or more external services, at least some of which may be monitoring services, may collect events and provide the events to the system 400. Events as described above may be comprised of, or transmitted to the system 400 via, SMS messages, HTTP requests/posts, API calls, log file entries, trouble tickets, emails, or the like. An event may include associated information, such as source, a creation time stamp, a status indicator, more information, fewer information, other information, or a combination thereof, that may be tracked.

In at least one of the various embodiments, the data store 410 may be arranged to store performance metrics, configuration information, event history, alert history, incident history, or the like, for the system 400. Data related to events, alerts, incidents, notifications, other types of objects, or a combination thereof may be stored in the data store 410. The data store 410 can include data related to resolved and unresolved alerts. The data store 410 can include data identifying whether alerts are or not acknowledged. In an example, the data store 410 may be implemented as one or more relational database management systems, one or more object databases, one or more XML databases, one or more operating system files, one or more unstructured data databases, one or more synchronous or asynchronous event or data buses that may use stream processing, one or more other suitable non-transient storage mechanisms, or a combination thereof.

With respect to a resolved alert, the data store 410 can include information regarding the resolving entity that resolved the alert (and/or, equivalently, the resolving entity of the event that triggered the alert), the duration that the alert was active until it was resolved, other information, or a combination thereof. The resolving entity can be a responder (e.g., a human). The resolving entity can be an integration (e.g., automated system), which can indicate that the alert was auto resolved. That the alert is auto resolved can mean that the system 400 received, such as from the integration, an event indicating that a previous event, which triggered the alert, is resolved. The integration may be a monitoring system.

The data store 410 can include data related to actions performed with respect to alerts. The data store 410 can include data indicating whether an action cleared (or contributed to clearing) a triggering event, or equivalently, the event. The data store 410 can also include associations (i.e., action-component associations) between actions and IT components and associations (i.e., alert-to-component associations) between alerts (i.e., alert types) and IT components.

The data store 410 can include historical data of incidents including a record of a quantity of components having unresolved incidents. The quantity of components having unresolved incidents may be arranged by organization, hardware dependencies, external service dependencies, and internal service dependencies. The data store 410 may store a metric for regular time intervals from which statistics may be calculated and/or the data store may store statistics that have already been calculated for the regular time intervals.

In at least one of the various examples, the outage risk determination tool 412 may be arranged to receive information from the incident generation event processing service about current incidents, whether they be resolved or unresolved, and determine an estimate of an outage risk. In some examples, this may include tracking incident metrics related to the events and generating statistical information about the incidents. The outage risk determination tool 412 may track incident metrics and generate statistical information about the incidents on a per computer service basis, a per computer service provider basis, a per organization basis, and combinations of the same.

The outage risk determination tool 412 receives data from the different event processing services that process events, alerts, or incidents for the organizations. Receiving data from an event processing service by the outage risk determination tool 412 encompasses receiving data directly from the event processing service and/or accessing (e.g., polling for, querying for, asynchronously being notified of, etc.) data generated (e.g., set, assigned, calculated by, stored, etc.) by the event processing service. The outage risk determination tool 412 can receive (e.g., query for, read, etc.) data from the data store 410. The outage risk determination tool 412 can write (e.g., update, etc.) data in the data store 410.

While FIG. 4 is shown as including one outage risk determination tool 412, the disclosure herein is not so limited and the system 400 can include more than one outage risk determination tool 412. In an example, different outage risk determination tools may be configured to receive data from event processing services of one or more partitions. In an example, each partition may be associated with one outage risk determination tool. Other configurations or mappings between partitions, services, and outage risk determination tools are possible.

The risk alert tool 414 may be arranged to generate risk alerts in response to the outage risk determination tool 412 detecting that there is a risk of an outage. Alerts may be sent to organizations, may trigger actions such as rerouting operations from an operation detected to have an outage risk, or may perform any other such action so as to prevent or minimize the effect of the outage on an organization. The alerts may be transmitted to responders (e.g., responsible users, teams) of an organization or automated systems. The outage risk tool 414 may select a messaging provider that may be used to deliver an alert to the organization.

In at least one of the various embodiments, the system 400 may include various user-interfaces or configuration information (not shown) that enable organizations to establish parameters and preferences for the outage risk determination tool and the response tool. Accordingly, an organization may define rules, conditions, priority levels, notification rules, escalation rules, routing keys, or the like, or combination thereof, that may be associated with different types of events. For example, some events may be informational rather than associated with a critical failure. Accordingly, an organization may establish different rules or other handling mechanics for the different types of events. For example, in some embodiments, critical events may require immediate (e.g., within the target lag time) generation of an incident. In other cases, the events may simply be recorded for future analysis or grouping with related incidents. For example, an organization may configure one or more event processing services to auto-pause incident notifications (or, equivalently, to auto-pause alerts).

In at least some instances, the system 400 may include various user-interfaces or configuration information (not shown) that enable organizations to define risk levels, define thresholds for the risk levels, and define actions to take in response to determine a risk level has been exceeded. An organization may define different risk levels, thresholds, and actions for different computer services, different computer service providers, and for the organization.

Figure 5:
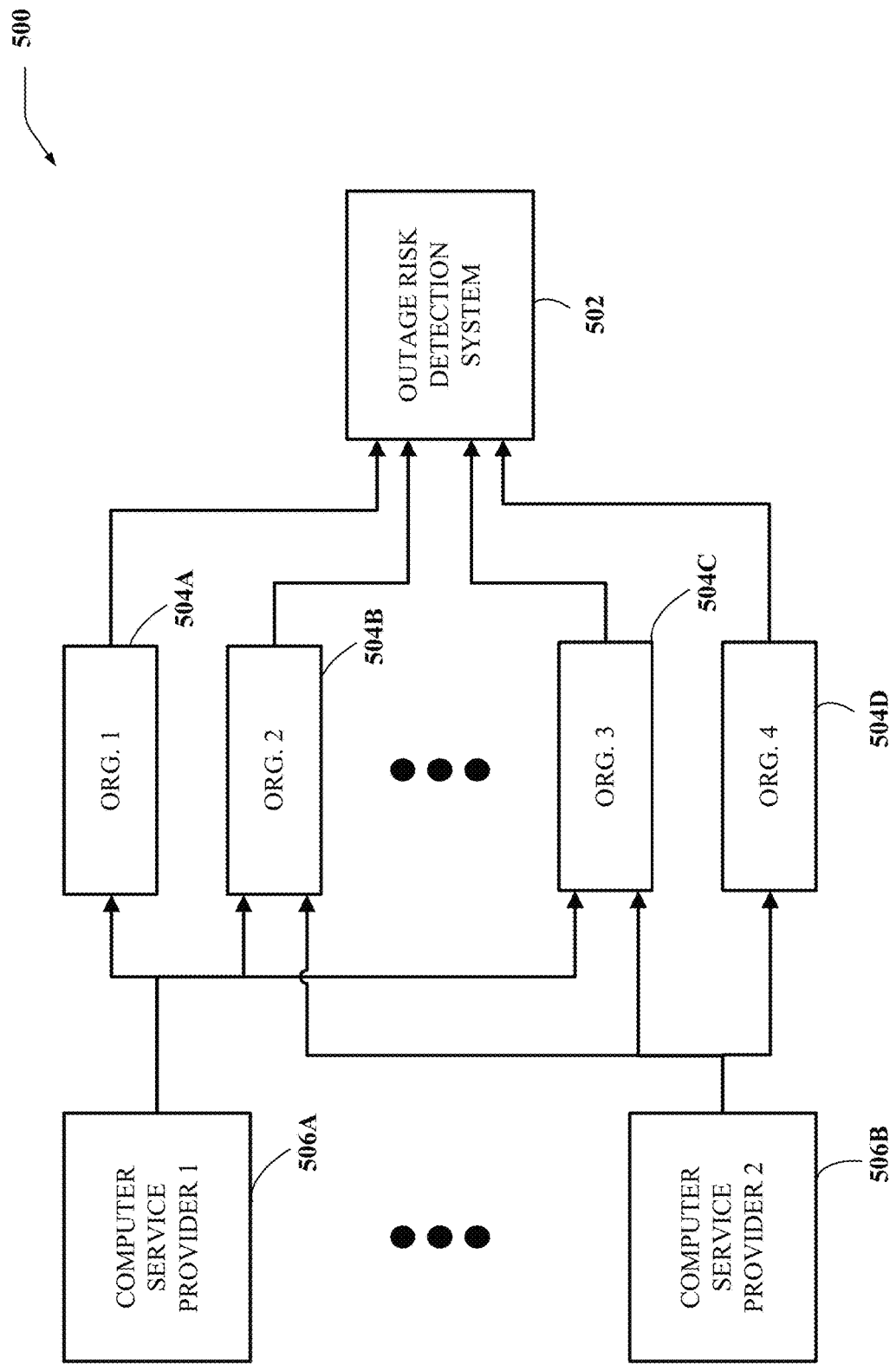
FIG. 5 is a block diagram of an example environment for outage risk detection alerts.

FIG. 5 is a block diagram of an example environment 500 for implementing an outage risk detection system 502 for generating an outage risk detection alert that includes the outage risk detection system 502, four external organizations 504A-504D that report events to the outage risk detection system 502, and two computer service providers 506A-506B that provide computer services to the organizations 504A-504D. Although four organizations 504A-504D are shown, more or less organizations are possible. Similarly, although two computer service providers 506A-506B are shown, more or less computer service providers may provide computer services to the organizations 504A-504D. The outage risk detection system 502 may be increasingly sensitive and accurate as the quantity of organizations using the system and the number of monitored services increases. The relationships shown in the example environment 500 are merely one possibility of how the various computer service providers and organizations work may interact. In some instances, the outage risk detection system 502 may be the system 400 of FIG. 4.

The computer service providers 506A, 506B provide computer services such as cloud computing instances, cloud databases, cloud storage, cloud analytics, payment processing services, or other computer services. In some instances, a computer service provider may provide more than one computer service. Additionally, in some instances, a first computer service provider 506A and a second computer service provider 506B may provide overlapping computing services that provide similar functionality. For example, the first computer service provider 506A and the second computer service provider 506B may each provide cloud storage services.

The organizations 504A-504D are separate entities that are remotely located from one another and have no organizational relationship between one another. They may be related in the sense that they may share a common computer service provider, share the same system for generating an outage risk detection alert, and may provide similar services. However, each organization may be otherwise independent from the remaining organizations. Organizations generally do not share computer service incidents with one another and there may be no visibility of service incidents between organizations. This information is generally kept private for reasons such as security, business competitiveness, and/or privacy concerns. For example, the current computer service incidents for the first organization 504A are not available to a second organization 504Bb and the current computer service incidents for the second organization 504B are not available to the first organization 504A. Thus, each organization is unable to see computer serve incidents across the group of organizations and are generally unaware of the status of a computer service of a different organization. Therefore, a single organization is not able to determine the risk of a computer service outage based on incidents from any of the other organizations. However, because each of the organizations provide computer service events to the same outage risk detection system, the outage risk detection system is able to aggregate the event data and determine the risk of a computer service outage in real time that would otherwise not be visible to an organization.

Each organization may implement a computer service provided by a computer service provider. For instance, in the example of FIG. 5, a first organization 504A implements computer services from a first computer service provider 506A, a second organization 504B implements computer services from the first computer service provider 506A and the second computer service provider 506B, a third organization 504C implements computer services from the first computer service provider 506A and the second computer service provider 506B, and a fourth organization 504D implements services from the second computer service provider 506B. In addition to the external service providers 506A, 506B, each organization may have internal computer services such as internal databases, internal storage, internal networks, internal computer systems, and internal analytic services. Each of the organizations reports events to the outage risk detection system 502 and use the outage risk detection system 502 to generate an outage risk detection alert in response to the system determining that there is a risk of a computer service outage.

Each organization reports events to the system for generating an outage risk detection alert, which may include an event generation service to generate incidents based on the events reported by an organization. The events may include information identifying the organization that event is for, the time the event occurred, a computer service provider that the event is associated with if applicable, a component, such as a computer service, that the event is associated with, and an indication of the severity of the event if known. The information may be included in an incident generated based on the event. The outage risk detection system 502 may organize the incidents into incident groups, such as according to a computer service provider that generated the incident, regardless of the computer service provided or the organization reporting the event, according to the computer service that generated the incident regardless of the organization that reported the event, and according to the organization that reported the event regardless of any computer service provider providing a computer service that triggered the event or whether the event is an external computer service, internal computer service, or other component. Other groupings are possible where there exists a common attribute for grouping the incidents. Each incident may be included in more than one incident group. For example, an incident generated from an event triggered by an external computer service may be grouped in an incident group associated with the computer service provider, an incident group associated with the external computer service, and an incident group associated with the organization that generated the incident.

As will be described in relation to FIG. 6, the outage risk detection system 502 may analyze the incidents for each incident group and determine if operations associated with the incident group are at risk for an outage. For example, the outage risk detection system 502 may determine if the operation of a computer service provider is at risk of an outage, if operations of a computer service are at risk of an outage, or if operations of an organization are at risk of an outage.

Figure 6:
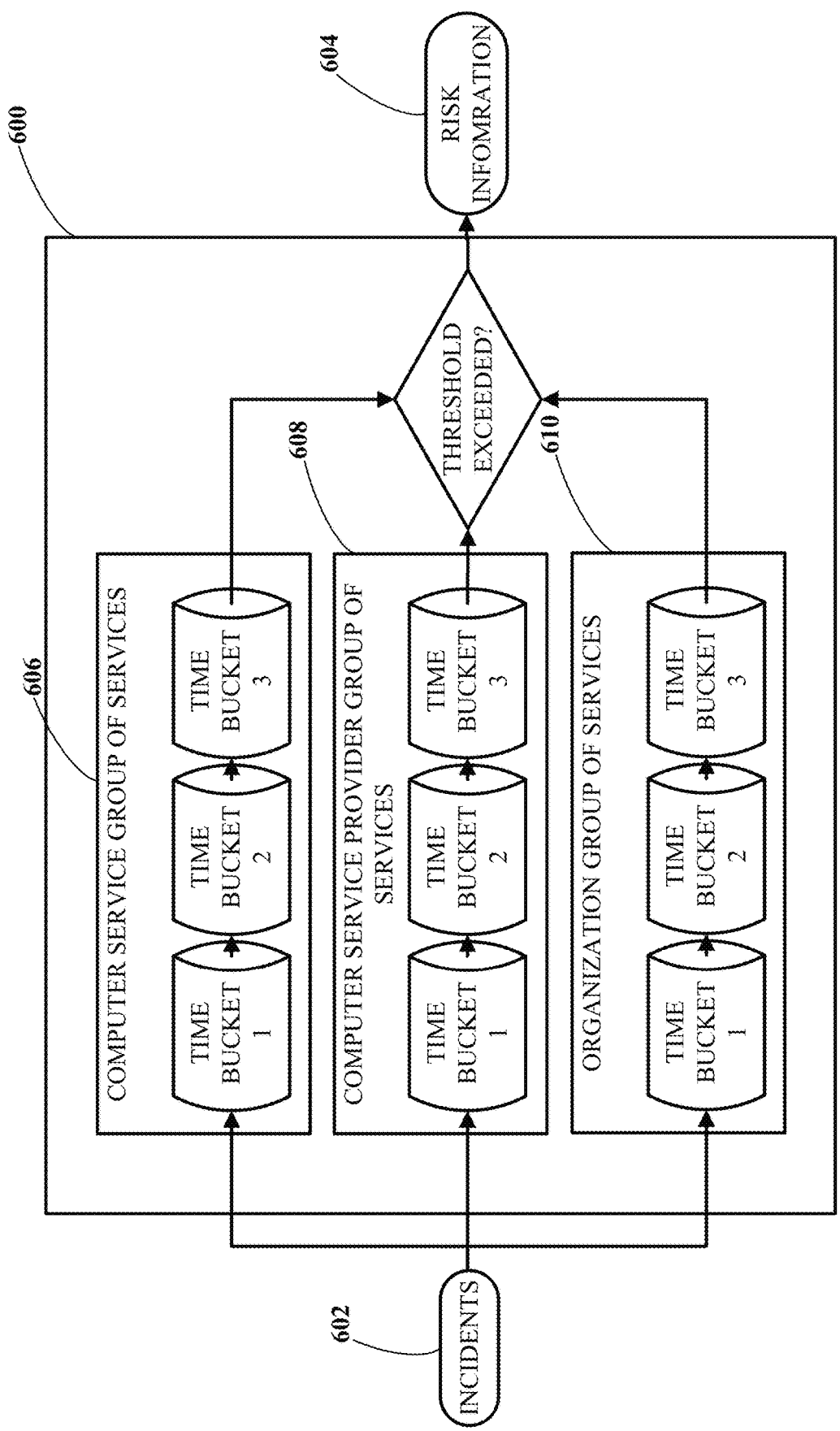
FIG. 6 is a block diagram of an example architecture for an outage risk determination tool.

FIG. 6 illustrates an example outage risk determination tool 600 that may detect a risk of an operation outage. For clarity, the outage risk determination tool 600 is shown as a standalone component, but in actual use the outage risk determination tool 600 may be a part of a larger system, such as the system 400 of FIG. 4 or the outage risk detection system 502 of FIG. 5. The outage risk determination tool 600 is configured to receive incidents 602 and generate risk information 604 indicating a level of outage risk of an operation based on the received incidents 602. The outage risk determination tool 600 may deliver the risk information 604 to risk alert tool such as risk alert tool 414, which may be responsible for generating an alert based on the risk information 604.

The outage risk determination tool 600 is shown as organizing incidents 602 into a computer service incident group 606, a computer service provider incident group 608, and an organization incident group 610. Generally, a computer service incident group 606 includes incidents that are derived from a computer service common to the incidents in the computer service incident group 606. The incidents may be for different organizations, but the incidents may still be grouped together so long as the incidents are related to a common computer service of the computer service incident group 606. For example, incidents from two different organizations that each use a particular external database computer service from the same computer service provider would be grouped together in a computer service incident group for the particular external database computer service. Incidents that are related to the same computer service provider, but that are not related to the same external computer service, would not be included in the same computer service incident group with one another. For example, an incident related to an external database computer service from a computer service provider would not be grouped with an incident related to an external storage computer service from the same computer service provider. Instead, incidents sharing a common service provider may be grouped together in a computer service provider incident group 608 for that particular computer service provider. A computer service provider incident group 608 contains incidents that are related to a common computer service provider. The organization incident group 610 contains incidents that are related to a common organization, even if the incidents are from different computer service providers or different computer services. For example, an organization incident group may contain incidents that are related to a single organization. Other incident groups are possible and the outage risk determination tool 600 may include multiple computer service incident groups 606, computer service provider incident groups 608, and organization incident groups 610. For example, if the outage risk determination tool 600 is monitoring fifty different computer services, there may be fifty different computer service incident groups 606. Similarly, each computer service provider may have an associated computer service provider incident group 608 and each organization may have an associated organization incident group 610.

In some instances, the outage risk determination tool 600 may filter the incidents. The outage risk determination tool 600 may filter the incidents depending on if they are derived from a component that is likely to be impactful on the risk of an outage. In some instances, the outage risk determination tool 600 may filter the service according to historical data. For example, the outage risk determination tool 600 may filter incidents based on the component an incident is derived from. Incidents that require human interaction to resolve may be likely to be correlated to an outage, while incidents that auto resolve may be less likely to be correlated to an outage. Therefore, the outage risk determination tool 600 may identify a component as impactful based on how incidents derived from that component were historically resolved. In one example, impactful components may be those in which greater than 40% of incidents derived from the component and resolved in the prior 30 days were acknowledged by a human responder, less than 10% of incidents derived from the component in the prior 30 days were auto-resolved, greater than 20% of the alerts in the prior 30 days were sent to a responder's mobile phone, and at least one unique human responder was notified by mobile phone. Other criteria for determining impactful components may be used and the preceding is merely one example. The outage risk determination tool 600 may filter the incidents to include incidents that are derived from impactful components.

In some implementations, the filtering may be based on past performance of the outage risk determination tool 600. In such implementations an organization can confirm whether a previous outage risk determination by the outage risk determination tool 600 resulted in an outage. In instances in which a previous outage risk determination is confirmed by the organization to have resulted in an outage, the outage risk determination tool 600 may analyze the services to find those that are correlated with the outage. The correlation may be a time based correlation. For example, the outage risk determination tool 600 may identify the services that were commonly active when the service outage occurred. The outage risk determination tool 600 may then use the identity of the services to filter the current incidents to include those that were identified as corresponding to an outage.

In instances in which an organization indicates an outage did not occur despite receiving an outage risk alert, the outage risk determination tool 600 may analyze the services to determine services that were correlated with the outage risk alert. For example, the outage risk determination tool 600 may identify the services generated incidents and were counted by the outage risk determination tool 600 when determining an outage risk. The outage risk determination tool 600 may then use the identify of these services to filter the current incidents to omit those that were identified as corresponding to the alert. The filtering of the services that are used in determining an outage risk can increase the signal-to-noise ratio of the data collected by the outage risk determination tool 600. The increased signal-to-noise ratio results in greater confidence in the outage risk determination and a lower false positive rate. Additionally, in some instances the increased signal-to-noise ratio can result in an earlier detection of an outage. The outage risk determination tool 600 may group incidents based on information associated with an incident such as metadata or payload information. In some instances, a separate service may group or tag incidents for a group. A single incident may be grouped with more than one incident group if the single incident matches criteria for more than one incident group. For example, an incident may have an associated computer service, an associated computer service provider, and an associated organization. Therefore, the incident may be grouped in a computer service incident group 606 corresponding to computer service associated with the incident, a computer service provider incident group 608 corresponding to a computer service provider associated with the incident, and an organization incident group 610 corresponding to the incident.

The outage risk determination tool 600 uses the incident information to determine a quantity of how many distinct entities associated with an incident group are currently experiencing an incident. A distinct entity is a unique component of an incident group that has multiple incidents attributed to it. For example, the outage risk determination tool 600 may identify each organization as a distinct entity for the computer service incident group 606 and count the number of organizations having an incident for the computer service associated with the computer service incident group 606. In another example, the outage risk determination tool 600 may identify each organization as a distinct entity in a computer service provider incident group 608 and count the number of organizations having an incident for the computer service provider associated with the computer service provider incident group 608. In yet another example, the outage risk determination tool 600 may identify each computer service as a distinct entity for an organization incident group 610 and count the number of computer services having an incident for the organization incident group 610. In some examples, the outage risk determination tool may only count computer services that have a threshold level of incidents. For example, if the threshold level is three incidents, a computer service will not be counted until it has at least three incidents. The threshold level may be set using a configuration value.

Thus, at any given time, the outage risk determination tool 600 tracks a current number of distinct entities in an incident group that have current incidents. In some examples, incidents are counted when they are first generated, while in other examples incidents are counted for as long as the incidents remain open. The number of distinct entities experiencing at least one incident for each computer service group may be recorded by the outage risk determination tool 600.

The outage risk determination tool 600 may record the number of distinct entities experiencing an incident into at least one time bucket for each incident group. A time bucket is time window of fixed duration for counting the number of distinct entities experiencing an incident. Although the time window is of a fixed duration, the time period represented by a time bucket is continually updated as time elapses such that a time bucket represents a current time window. The time bucket may be for a fixed duration such as five minutes, fifteen minutes, and thirty minutes. The time buckets may overlap temporally.

The outage risk determination tool 600 uses historical information associated with the time buckets to calculate statistical information that can be used to determine an outage risk threshold for the time buckets of each incident group. For example, each time bucket is associated with a plurality of historical time windows that correspond to the time bucket at a past time. The outage risk determination tool 600 may determine a baseline aggregate count of the number of distinct entities for a time bucket and a measure of historical variability. In some implementations, the baseline aggregate count is a statistical norm such as a mean or median of the aggregate count of distinct entities in the plurality of time windows and the historical variability is a statistical deviation such as a median absolute deviation or standard deviation of the number of distinct entities in the plurality of time windows. The plurality of time windows can include time windows for a current time interval, such as the most recent week. In other words, the statistical norm measures a typical number of distinct entities in a time bucket and the statistical deviation measures how the typical number of distinct entities varies. Other statistical information may be calculated based on the number of distinct entities experiencing an incident in each time window. The statistical norm and the statistical deviation of the number of distinct entities in historical time windows can be used to calculate a risk threshold for each time bucket. For example, each threshold may correspond to the statistical norm number of distinct entities plus a multiple of the number of statistical deviations.

Each time bucket may correspond to a different type of risk. For example, a shorter duration time bucket may correspond to a leading edge indicator while longer time durations may give a wider perspective of the risk of service outage.

In some instances, the outage risk determination tool 600 may use four different thresholds for reporting the risk of an outage for an incident group. For example, distinct entity counts below one statistical deviation above the statistical norm may correspond to a low risk, distinct entity counts that exceed two statistical deviations above the statistical norm may indicate a medium risk, distinct entity counts that exceed three statistical deviations above the statistical norm may indicate a high risk, and distinct entity counts that exceed four statistical deviations above the statistical norm may indicate an extreme risk.

When a threshold number of distinct entity counts is exceeded, the outage risk determination tool may send risk information to an alert generation tool to generate an alert. The risk information may include such information as an identification of the bucket generating the alert and the risk level determined by the outage risk determination tool 600. For example, the outage risk determination tool 600 may send the risk information to the risk alert tool 414 of FIG. 4. The risk alert tool may generate an alert based on the risk information. The alert and any action triggered by the alert may depend on the determined level of outage risk, the computer services associated with the time buck that are at risk of outage, and organizational preferences. For example, when a computer service is determined to be at a high risk of outage, the risk alert tool may send a message to each organization associated with the computer service. If the computer service is determined to be at an extreme risk of outage, the risk alert tool may elevate the response by sending a different message or performing another action.

Figure 7:
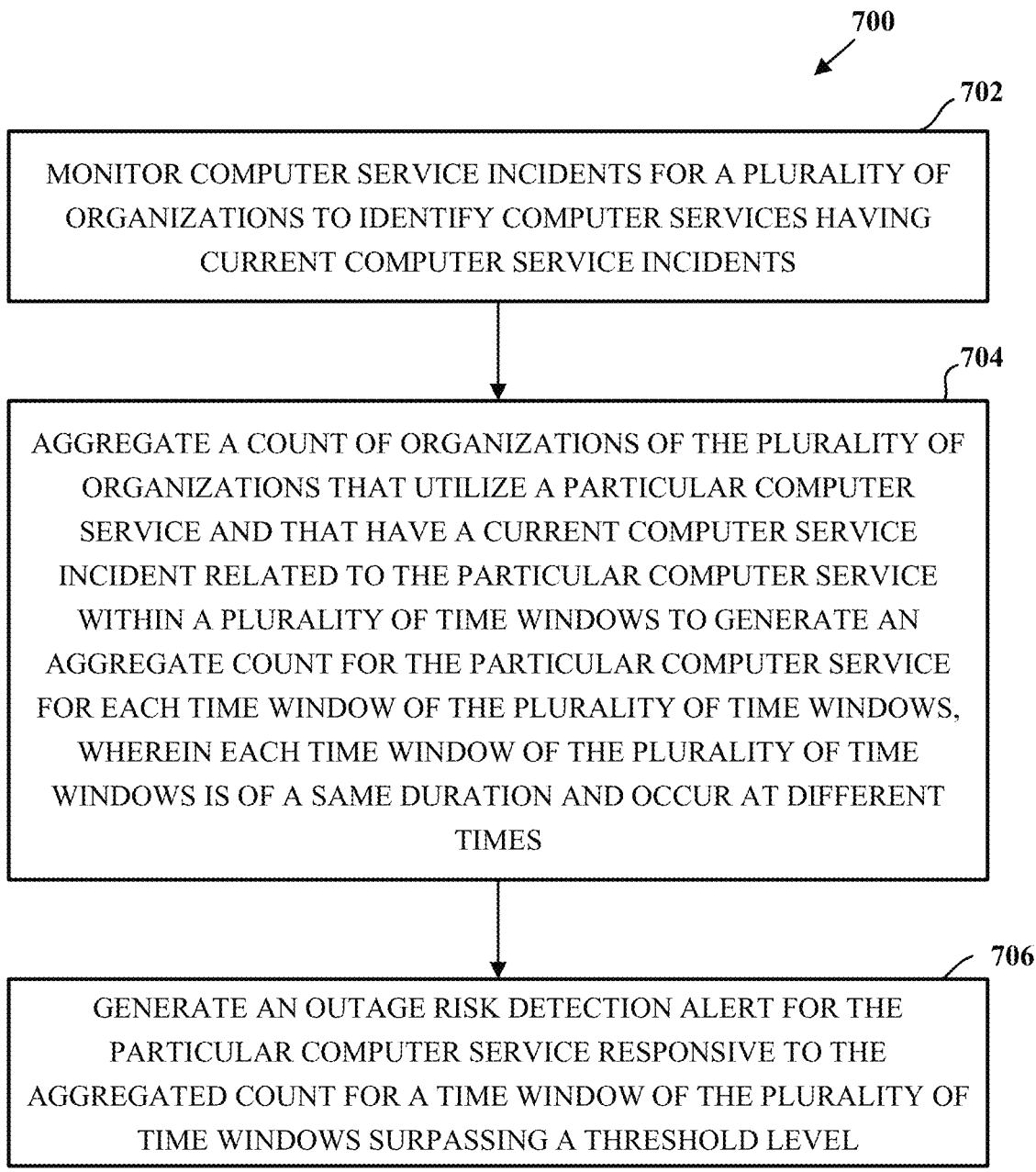
FIG. 7 is a flow chart illustrating an example technique for generating outage risk detection alerts.

FIG. 7 is a flowchart of an example technique 700 for generating an outage risk detection alert. The technique 700 may be implemented in a system, such as the system 400 of FIG. 4. The actions illustrated in the flowchart of FIG. 7 may be implemented as executable instructions that may be stored in a memory, such as the memory 204 of FIG. 2 or the memory 304 of FIG. 3. The executable instructions may be executed by a processor, such as the processor 202 of FIG. 2 or the processor 302 of FIG. 3.

At 702, computer service incidents for a plurality of organizations are monitored to identify computer services having current computer service incidents. For example, the outage risk determination tool 600 of FIG. 6 monitors computer service incidents generated by a computer incident generation service, such as the computer incident generation service 406A of FIG. 4.

At 704, a count of organizations of the plurality of organizations that utilize a particular computer service and that have a current computer service incident related to the particular computer service within a plurality of time windows is aggregated to generate an aggregate count for the particular computer service for each time window of the plurality of time windows. Each time window of the plurality of time windows is of a same duration and occur at different times. For example, referring to FIG. 6, the outage risk determination tool 600 aggregates a count of the number of organizations in the computer service incident group 606 for each historical time window corresponding to the computer service incident group 606 time bucket.

At 706, an outage risk detection alert for the particular computer service is generated responsive to the second aggregated count for a time window of the plurality of time windows surpassing a second threshold level. For example, the outage risk determination tool 600 can trigger an alert responsive to the aggregate count exceeding a set threshold. In some instances, the threshold can be determined by the outage risk determination tool based on the aggregate count of each time windows of the plurality of time windows. The threshold can be a statistical norm of the aggregate count for the plurality of time windows plus a statistical deviation of the aggregate count for the plurality of time windows.

In some instances, the monitoring is performed by the outage risk detection system for the plurality of organizations, wherein the current computer service incidents for a first organization are not available to a second organization and the current computer service incidents for the second organization are not available to the first organization, and wherein the outage risk detection alert is provided to both the first organization and the second organization.

The disclosed technique for generating an outage risk detection alert detects and alerts organizations when an outage risk is detected in an environment with noisy signals. The outage risk may be an outage risk of an external computer service provider, an external computer service, or an outage risk for the organization. The technique may use relatively low computing resources and can be included in an event management bus system to provide an organization with improved detection and notification of outage risks. The different time buckets may predict outage risks at the leading edge of an outage and provide information regarding ongoing outages. Furthermore, because the technique is external to an organization and computer service provider, the technique can notify organizations and computer service providers when the organization or computer service providers tools are experiencing an outage.

For simplicity of explanation, the technique in FIG. 7 is depicted and described herein as respective series of steps or operations. However, the steps or operations in accordance with this disclosure can occur in various orders and/or concurrently. Additionally, other steps or operations not presented and described herein may be used. Furthermore, not all illustrated steps or operations may be required to implement a technique in accordance with the disclosed subject matter.

The phrase "in one aspect" as used herein does not necessarily refer to the same aspect, though it may. Furthermore, the phrase "in another aspect" as used herein does not necessarily refer to a different aspect, although it may. Thus, as described below, various aspects may be readily combined, without departing from the scope or spirit of the disclosure.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

The following terms are also used herein according to the corresponding meaning, unless the context clearly dictates otherwise.

As used herein the term, "engine" refers to logic embodied in hardware or software instructions, which can be written in a programming language, such as C, C++, Objective-C, COBOL, Java™, PHP, Perl, JavaScript, Ruby, VB Script, Microsoft .NET™ languages such as C#, and/or the like. An engine may be compiled into executable programs or written in interpreted programming languages. Software engines may be callable from other engines or from themselves. Engines described herein refer to one or more logical modules that can be merged with other engines or applications, or can be divided into sub-engines. The engines can be stored in non-transitory computer-readable medium or computer storage devices and be stored on and executed by one or more general purpose computers, thus creating a special purpose computer configured to provide the engine.

Functional aspects can be implemented in algorithms that execute on one or more processors. Furthermore, the implementations of the systems and techniques disclosed herein could employ a number of conventional techniques for electronics configuration, signal processing or control, data processing, and the like. The words "mechanism" and "component" are used broadly and are not limited to mechanical or physical implementations, but can include software routines in conjunction with processors, etc. Likewise, the terms "system" or "tool" as used herein and in the figures, but in any event based on their context, may be understood as corresponding to a functional unit implemented using software, hardware (e.g., an integrated circuit, such as an ASIC), or a combination of software and hardware. In certain contexts, such systems or mechanisms may be understood to be a processor-implemented software system or processor-implemented software mechanism that is part of or callable by an executable program, which may itself be wholly or partly composed of such linked systems or mechanisms.

Implementations or portions of implementations of the above disclosure can take the form of a computer program product accessible from, for example, a computer-usable or computer-readable medium. A computer-usable or computer-readable medium can be a device that can, for example, tangibly contain, store, communicate, or transport a program or data structure for use by or in connection with a processor. The medium can be, for example, an electronic, magnetic, optical, electromagnetic, or semiconductor device. Other suitable mediums are also available. Such computer-usable or computer readable media can be referred to as non-transitory memory or media, and can include volatile memory or non-volatile memory that can change over time. A memory of an apparatus described herein, unless otherwise specified, does not have to be physically contained by the apparatus, but is one that can be accessed remotely by the apparatus, and does not have to be contiguous with other memory that might be physically contained by the apparatus.

While the disclosure has been described in connection with certain implementations, it is to be understood that the disclosure is not to be limited to the disclosed implementations but, on the contrary, is intended to cover various modifications and equivalent arrangements included within the scope of the appended claims, which scope is to be accorded the broadest interpretation so as to encompass all such modifications and equivalent structures as is permitted under the law.

The sequence diagram in FIG. 7 may be encoded in a signal bearing medium, a computer readable medium such as a memory, programmed within a device such as one or more integrated circuits, or processed by a controller or a computer. If the methods are performed by software, the software may reside in a memory resident to or interfaced to the any type of non-volatile or volatile memory interfaced or resident to the memory incorporated in the components of the computing environment 100. Such memory may include an ordered listing of executable instructions for implementing logical functions. A logical function may be implemented through digital circuitry, through source code, through analog circuitry, or through an analog source such through an analog electrical, audio, or video signal. The software may be embodied in any computer-readable or signal-bearing medium, for use by, or in connection with an instruction executable system, apparatus, or device. Such a system may include a computer-based system, a processor-containing system, or another system that may selectively fetch instructions from an instruction executable system, apparatus, or device that may also execute instructions.

A "computer-readable medium," "machine-readable medium," "propagated-signal" medium, and/or "signal-bearing medium" may comprise any means that contains, stores, communicates, propagates, or transports software for use by or in connection with an instruction executable system, apparatus, or device. The machine-readable medium may selectively be, but not limited to, an electronic, magnetic, optical, electromagnetic, infrared, or semiconductor system, apparatus, device, or propagation medium. A non-exhaustive list of examples of a machine-readable medium would include: an electrical connection "electronic" having one or more wires, a portable magnetic or optical disk, a volatile memory such as a Random Access Memory "RAM" (electronic), a Read-Only Memory "ROM" (electronic), an Erasable Programmable Read-Only Memory (EPROM or Flash memory) (electronic), or an optical fiber (optical). A machine-readable medium may also include a tangible medium upon which software is printed, as the software may be electronically stored as an image or in another format (e.g., through an optical scan), then compiled, and/or interpreted or otherwise processed. The processed medium may then be stored in a computer and/or machine memory.

While various aspects of the disclosure have been described, it will be apparent to those of ordinary skill in the art that many more aspects and implementations are possible within the scope of the disclosure. Accordingly, the disclosure is not to be restricted except in light of the attached claims and their equivalents.

What is claimed is:

1. A method for generating outage risk detection alerts for an organization using an outage risk detection system that monitors a plurality of organizations and that includes one or more processors that perform actions comprising:
    configuring an event management bus to ingest received events at an acceptance rate, wherein each received event indicates a respective condition, detected by a respective monitoring tool, with respect to a respective computing component within a respective computing environment;
    ingesting received events according to the acceptance rate,
        wherein at least some of the received events are received via one of a Short Message Service (SMS) message, a HyperText Transfer Protocol (HTTP) request, or an Application Programming Interface (API) call, and
        wherein ingesting the received events according to the acceptance rate comprises:
            in response to determining that a received event is not received in accordance with the acceptance rate:
                rejecting the received event, and
                transmitting a rejection notification to a system from which the received event is received indicating that the received event is not accepted for processing;
    monitoring, based on ingested events, computer service incidents for the plurality of organizations to identify computer services having current computer service incidents,
        wherein the computer services are such that they have incidents that historically require human interaction to resolve, and
        wherein each of first service incidents of any of the plurality of organizations is not visible or displayable to members of every other of the plurality of organizations;
    aggregating a count of organizations of the plurality of organizations that utilize a particular computer service and that have a current computer service incident related to the particular computer service within a plurality of time windows to generate an aggregate count for the particular computer service for each time window of the plurality of time windows, wherein each time window of the plurality of time windows is of a same duration and occur at different times; and
    generating an outage risk detection alert for the particular computer service responsive to the aggregate count for a time window of the plurality of time windows surpassing a threshold level.

2. The method of claim 1, wherein the monitoring is performed by the outage risk detection system for the plurality of organizations, wherein the current computer service incidents for a first organization are not available to a second organization and the current computer service incidents for the second organization are not available to the first organization, and wherein the outage risk detection alert is provided to both the first organization and the second organization.

3. The method of claim 1, wherein the one or more processors further perform actions comprising:
    determining a baseline aggregate count for the particular computer service based on a statistical norm aggregate count for the plurality of time windows; and
    determining a historical variability for the aggregate count for the particular computer service based on a statistical deviation of the aggregate count for the plurality of time windows,
        wherein the threshold level is based on the baseline aggregate count and a multiple of the historical variability.

4. The method of claim 1, wherein the one or more processors further perform actions comprising:
    aggregating a second count of organizations of the plurality of organizations that utilize a particular computer service provider and that have a current computer service incident related to the particular computer service provider within the plurality of time windows to generate a second aggregate count for the particular computer service provider for each time window of the plurality of time windows; and
    generating an outage risk detection alert for the particular computer service provider responsive to the second aggregated count for a time window of the plurality of time windows surpassing a second threshold level.

5. The method of claim 1, wherein the one or more processors further perform actions comprising:
    aggregating a count of computer services of the organization that have a current computer service incident within the plurality of time windows to generate a third aggregate count for each time window of the plurality of time windows; and
    generating an outage risk detection alert for the organization responsive to the third aggregated count for a time window of the plurality of time windows surpassing a third threshold level.

6. The method of claim 1, further comprising:
    aggregating a second count of organizations of the plurality of organizations that utilize the particular computer service and that have a current computer service incident related to the particular computer service within a second plurality of time windows to generate a second aggregate count for the particular computer service for each time window of the second plurality of time windows, wherein each time window of the second plurality of time windows is of a same second duration that is greater than the same duration of each time window of the plurality of time windows; and generating a second outage risk detection alert for the particular computer service responsive to the second aggregated count for a second time window of the second plurality of time windows surpassing a second threshold level.

7. An apparatus for generating an outage risk detection alerts for one or more organizations of a plurality of organizations, comprising:

a memory; and a processor, the processor configured to execute instructions stored in the memory to:

configure an event management bus to ingest received events at an acceptance rate, wherein each received event indicates a respective condition, detected by a respective monitoring tool, with respect to a respective computing component within a respective computing environment;

ingest received events according to the acceptance rate, wherein at least some of the received events are received via one of a Short Message Service (SMS) message, a HyperText Transfer Protocol (HTTP) request, or an Application Programming Interface (API) call, and wherein ingesting the received events according to the acceptance rate comprises:

in response to determining that a received event is not received in accordance with the acceptance rate;

reject the received event; and transmit a rejection notification to a system from which the received event is received indicating that the received event is not accepted for processing;

monitor computer service incidents for the plurality of organizations to identify computer services having current computer service incidents, wherein the computer services are filtered from a group of computer services to identify computer services that have incidents that historically require human interaction to resolve;

aggregate a count of organizations of the plurality of organizations that utilize a particular computer service and that have a current computer service incident related to the particular computer service within a plurality of time windows to generate an aggregate count for the particular computer service for each time window of the plurality of time windows, wherein each time window of the plurality of time windows is of a same duration and occur at different times; and generate an outage risk detection alert for the particular computer service responsive to the aggregate count for a time window of the plurality of time windows surpassing a threshold level.

8. The apparatus of claim 7, wherein the monitoring is performed by an outage risk detection system for the plurality of organizations, wherein the current computer service incidents for a first organization are not available to a second organization and the current computer service incidents for the second organization are not available to the first organization, and wherein the outage risk detection alert is provided to both the first organization and the second organization.

9. The apparatus of claim 7, wherein the one of more processors further perform actions comprising:

determine a baseline aggregate count for the particular computer service based on a statistical norm aggregate count for the plurality of time windows;

determine a historical variability for the aggregate count for the particular computer service based on a statistical deviation of the aggregate count for the plurality of time windows; and wherein the threshold level is based on the baseline aggregate count and a multiple of the historical variability.

10. The apparatus of claim 7, wherein the one of more processors further perform actions comprising:

aggregate a second count of organizations of the plurality of organizations that utilize a particular computer service provider and that have a current computer service incident related to the particular computer service provider within the plurality of time windows to generate a second aggregate count for the particular computer service provider for each time window of the plurality of time windows; and generate an outage risk detection alert for the particular computer service provider responsive to the second aggregated count for a time window of the plurality of time windows surpassing a second threshold level.

11. The apparatus of claim 7, wherein the one of more processors further perform actions comprising:

aggregate a count of computer services of an organization that have a current computer service incident within the plurality of time windows to generate a third aggregate count for each time window of the plurality of time windows; and generate an outage risk detection alert for the organization responsive to the third aggregated count for a time window of the plurality of time windows surpassing a third threshold level.

12. The apparatus of claim 7, wherein the one of more processors further perform actions comprising:

aggregate a second count of organizations of the plurality of organizations that utilize the particular computer service and that have a current computer service incident related to the particular computer service within a second plurality of time windows to generate a second aggregate count for the particular computer service for each time window of the second plurality of time windows, wherein each time window of the second plurality of time windows is of a same second duration that is greater than the same duration of each time windows of the plurality of time windows; and generate a second outage risk detection alert for the particular computer service responsive to the second aggregated count for a second time window of the second plurality of time windows surpassing a second threshold level.

13. A non-transitory computer-readable medium storing instructions operable to cause one or more processors to perform operations for generating an-outage risk detection alerts, the operations comprising:

configuring an event management bus to ingest received events at an acceptance rate, wherein each received event indicates a respective condition, detected by a respective monitoring tool, with respect to a respective computing component within a respective computing environment;

ingesting received events according to the acceptance rate, wherein at least some of the received events are received via one of a Short Message Service (SMS)

message, a HyperText Transfer Protocol (HTTP) request, or an Application Programming Interface (API) call, and wherein ingesting the received events according to the acceptance rate comprises:

in response to determining that a received event is not received in accordance withe the acceptance rate;

rejecting the received event; and transmitting a rejection notification to a system from which the received event is received indicating that the received event is not accepted for processing;

monitoring computer service incidents for a plurality of organizations to identify computer services having current computer service incidents, wherein the computer services are filtered from a group of computer services to identify computer services that have incidents that historically require human interaction to resolve;

aggregating a count of organizations of the plurality of organizations that utilize a particular computer service and that have a current computer service incident related to the particular computer service within a plurality of time windows to generate an aggregate count for the particular computer service for each time window of the plurality of time windows, wherein each time window of the plurality of time windows is of a same duration and occur at different times; and generating an outage risk detection alert for the particular computer service responsive to the aggregate count for a time window of the plurality of time windows surpassing a threshold level.

14. The non-transitory computer-readable medium of claim 13, wherein the monitoring is performed by an outage risk detection system for the plurality of organizations, wherein the current computer service incidents for a first organization are not available to a second organization and the current computer service incidents for the second organization are not available to the first organization, and wherein the outage risk detection alert is provided to both the first organization and the second organization.

15. The non-transitory computer-readable medium of claim 13, the operations further comprising:

determining a baseline aggregate count for the particular computer service based on a statistical norm aggregate count for the plurality of time windows; and determining a historical variability for the aggregate count for the particular computer service based on a statistical deviation of the aggregate count for the plurality of time windows;

wherein the threshold level is based on the baseline aggregate count and a multiple of the historical variability.

16. The non-transitory computer-readable medium of claim 13, the operations further comprising:

aggregating a second count of organizations of the plurality of organizations that utilize a particular computer service provider and that have a current computer service incident related to the particular computer service provider within the plurality of time windows to generate a second aggregate count for the particular computer service provider for each time window of the plurality of time windows; and generating an outage risk detection alert for the particular computer service provider responsive to the second aggregated count for a time window of the plurality of time windows surpassing a second threshold level.

17. The non-transitory computer-readable medium of claim 13, the operations further comprising:

aggregating a count of computer services of an organization that have a current computer service incident within the plurality of time windows to generate a third aggregate count for each time window of the plurality of time windows; and generating an outage risk detection alert for the organization responsive to the third aggregated count for a time window of the plurality of time windows surpassing a third threshold level.

* * * * *